US012219435B2

(12) United States Patent
Chin et al.

(10) Patent No.: US 12,219,435 B2
(45) Date of Patent: Feb. 4, 2025

(54) METHOD AND USER EQUIPMENT FOR MANAGEMENT OF MBS DATA RECEPTION

(71) Applicant: SHARP KABUSHIKI KAISHA, Sakai (JP)

(72) Inventors: Heng-Li Chin, Taipei (TW); Chia-Hung Lin, Taipei (TW); Hung-Chen Chen, Taipei (TW); Chia-Hung Wei, Taipei (TW); Yung-Lan Tseng, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 429 days.

(21) Appl. No.: 17/685,862

(22) Filed: Mar. 3, 2022

(65) Prior Publication Data

US 2022/0286818 A1    Sep. 8, 2022

Related U.S. Application Data

(60) Provisional application No. 63/156,813, filed on Mar. 4, 2021.

(51) Int. Cl.
| | |
|---|---|
| *H04W 4/06* | (2009.01) |
| *H04L 1/08* | (2006.01) |
| *H04L 1/1812* | (2023.01) |
| *H04W 24/08* | (2009.01) |
| *H04W 72/1263* | (2023.01) |
| *H04W 76/28* | (2018.01) |

(52) U.S. Cl.
CPC ............... *H04W 4/06* (2013.01); *H04L 1/08* (2013.01); *H04L 1/1812* (2013.01); *H04W 24/08* (2013.01); *H04W 72/1263* (2013.01); *H04W 76/28* (2018.02)

(58) Field of Classification Search
None
See application file for complete search history.

(56) References Cited

U.S. PATENT DOCUMENTS

| | | | |
|---|---|---|---|
| 2018/0110085 A1* | 4/2018 | Tseng | H04W 76/28 |
| 2019/0261287 A1* | 8/2019 | Deenoo | H04W 52/0216 |

(Continued)

OTHER PUBLICATIONS

3GPP TR 23.757, "3rd Generation Partnership Project; Technical Specification Group Services and System Aspects; Study on architectural enhancements for 5G multicast-broadcast services (Release 17)", V1.2.0 (Nov. 2020).

(Continued)

*Primary Examiner* — Liem H. Nguyen
(74) *Attorney, Agent, or Firm* — ScienBiziP, P.C.

(57) ABSTRACT

A method performed by a UE for management of MBS data reception is provided. The method includes receiving a DRX configuration mapped to an MBS, the DRX configuration including a timer and controlling activity of the UE for monitoring a PDCCH associated with a G-RNTI of the MBS; receiving a first DL assignment associated with the G-RNTI on the PDCCH; identifying an unsuccessful reception of a PDSCH that is scheduled by the first DL assignment and used for receiving data of the MBS; starting the timer after identifying the unsuccessful reception of the PDSCH; and enabling use of a C-RNTI to decode a second DL assignment while the timer is running. A UE using the method is also provided.

16 Claims, 7 Drawing Sheets

(56) References Cited

U.S. PATENT DOCUMENTS

| | | | | |
|---|---|---|---|---|
| 2019/0380078 A1* | 12/2019 | Fujishiro | ............... | H04W 48/20 |
| 2020/0008097 A1* | 1/2020 | Fujishiro | ............... | H04W 72/30 |
| 2022/0110184 A1* | 4/2022 | Jeon | ...................... | H04L 1/0015 |
| 2022/0124675 A1* | 4/2022 | Liu | ..................... | H04W 72/044 |
| 2022/0132277 A1* | 4/2022 | Shrivastava | ............ | H04W 4/06 |
| 2022/0232658 A1* | 7/2022 | Chen | .................... | H04W 76/20 |
| 2023/0309121 A1* | 9/2023 | Wang | ...................... | H04W 4/06 |
| 2023/0345509 A1* | 10/2023 | Kadiri | .................. | H04W 72/30 |
| 2023/0371046 A1* | 11/2023 | Babaei | .............. | H04W 72/0457 |
| 2023/0388972 A1* | 11/2023 | Chang | ..................... | H04W 4/06 |

OTHER PUBLICATIONS

3GPP TS 36.321, "3rd Generation Partnership Project; Technical Specification Group Radio Access Network; Evolved Universal Terrestrial Radio Access (E-UTRA); Medium Access Control (MAC) protocol specification (Release 16)", V16.2.0 (Sep. 2020).
3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 16)", V16.2.0 (Sep. 2020).
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", V16.3.0 (Sep. 2020).
3rd Generation Partnership Project; Technical Specification Group Radio Access Network; NR; Medium Access Control (MAC) protocol specification (Release 17), 3GPP TS 38.321 V17.0.0 (Mar. 2022).

* cited by examiner

METHOD AND USER EQUIPMENT FOR MANAGEMENT OF MBS DATA RECEPTION

CROSS-REFERENCE TO RELATED APPLICATION(S)

The present application claims the benefit of and priority to U.S. Provisional Patent Application Ser. No. 63/156,813 (hereafter referred to as "the '813 provisional"), filed on Mar. 4, 2021, entitled "METHOD AND APPARATUS TO HANDLE RECEPTION AND DATA RECOVERY OF NR MBS." The contents of the '813 provisional are hereby fully incorporated herein by reference for all purposes.

FIELD

The present disclosure generally relates to wireless communication, and more particularly, to a method and a user equipment (UE) for management of Multicast-Broadcast Service (MBS) data reception.

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in the next-generation wireless communication systems.

SUMMARY

The present disclosure is directed to a method and a UE for management of MBS data reception.

According to a first aspect of the present disclosure, a method performed by a UE for management of MBS data reception is provided. The method includes receiving a first Discontinuous Reception (DRX) configuration mapped to an MBS, the first DRX configuration including a first timer and controlling activity of the UE for monitoring a Physical Downlink Control Channel (PDCCH) associated with a Group Radio Network Temporary Identifier (G-RNTI) of the MBS; receiving a first Downlink (DL) assignment associated with the G-RNTI on the PDCCH; identifying an unsuccessful reception of a Physical Downlink Shared Channel (PDSCH) that is scheduled by the first DL assignment and used for receiving data of the MBS; starting the first timer after identifying the unsuccessful reception of the PDSCH; and enabling use of a Cell Radio Network Temporary Identifier (C-RNTI) to decode a second DL assignment while the first timer is running.

In some implementations of the first aspect of the present disclosure, the first timer is configured to determine a maximum duration until a retransmission of the data of the MBS is received.

In some implementations of the first aspect of the present disclosure, the second DL assignment schedules a retransmission of the data of the MBS.

In some implementations of the first aspect of the present disclosure, the first DL assignment and the second DL assignment are mapped to a same Hybrid Automatic Repeat Request (HARQ) process Identity (ID).

In some implementations of the first aspect of the present disclosure, the first DL assignment and the second DL assignment are scheduled on different PDCCHs or different search spaces.

In some implementations of the first aspect of the present disclosure, the method further includes enabling use of the G-RNTI to decode a third DL assignment while the first timer is running.

In some implementations of the first aspect of the present disclosure, the UE is configured with a Packet Data Convergence Protocol (PDCP) entity associated with a first Radio Link Control (RLC) entity and a second RLC entity; the first RLC entity is associated with the first DL assignment; and the second RLC entity is associated with the second DL assignment.

In some implementations of the first aspect of the present disclosure, the UE is configured with a set of one more DRX configurations including the first DRX configuration, and each DRX configuration in the set of DRX configurations is configured on a per-MBS basis.

In some implementations of the first aspect of the present disclosure, the method further includes receiving a second DRX configuration that does not map to any MBS, the second DRX configuration including a second timer; starting the second timer after identifying the unsuccessful reception of the PDSCH; and enabling use of the C-RNTI to decode the second DL assignment while the second timer is running.

According to a second aspect of the present disclosure, a UE for management of MBS data reception is provided. The UE includes computer-storage media storing at least one computer-executable instruction and at least one processor coupled to the computer-storage media. The at least one processor is configured to execute the at least one computer-executable instruction to receive a first DRX configuration mapped to an MBS, the first DRX configuration including a first timer and controlling activity of the UE for monitoring a PDCCH associated with a G-RNTI of the MBS; receive a first DL assignment associated with the G-RNTI on the PDCCH; identifying an unsuccessful reception of a PDSCH that is scheduled by the first DL assignment and used for receiving data of the MBS; start the first timer after identifying the unsuccessful reception of the PDSCH; and enable use of a C-RNTI to decode a second DL assignment while the first timer is running.

In some implementations of the second aspect of the present disclosure, the first timer is configured to determine a maximum duration until a retransmission of the data of the MBS is received.

In some implementations of the second aspect of the present disclosure, the second DL assignment schedules a retransmission of the data of the MBS.

In some implementations of the second aspect of the present disclosure, the first DL assignment and the second DL assignment are mapped to a same HARQ process ID.

In some implementations of the second aspect of the present disclosure, the first DL assignment and the second DL assignment are scheduled on different PDCCHs or different search spaces.

In some implementations of the second aspect of the present disclosure, the at least one processor is further configured to execute the at least one computer-executable instruction to enable to use of the G-RNTI to decode a third DL assignment while the first timer is running.

In some implementations of the second aspect of the present disclosure, the UE is configured with a PDCP entity associated with a first RLC entity and a second RLC entity; the first RLC entity is associated with the first DL assignment; and the second RLC entity is associated with the second DL assignment.

In some implementations of the second aspect of the present disclosure, the UE is configured with a set of one more DRX configurations including the first DRX configuration, and each DRX configuration in the set of DRX configurations is configured on a per-MBS basis.

In some implementations of the second aspect of the present disclosure, the at least one processor is further configured to execute the at least one computer-executable instruction to receive a second DRX configuration that does not map to any MBS, the second DRX configuration including a second timer; start the second timer after identifying the unsuccessful reception of the PDSCH; and enable use of the C-RNTI to decode the second DL assignment while the second timer is running.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
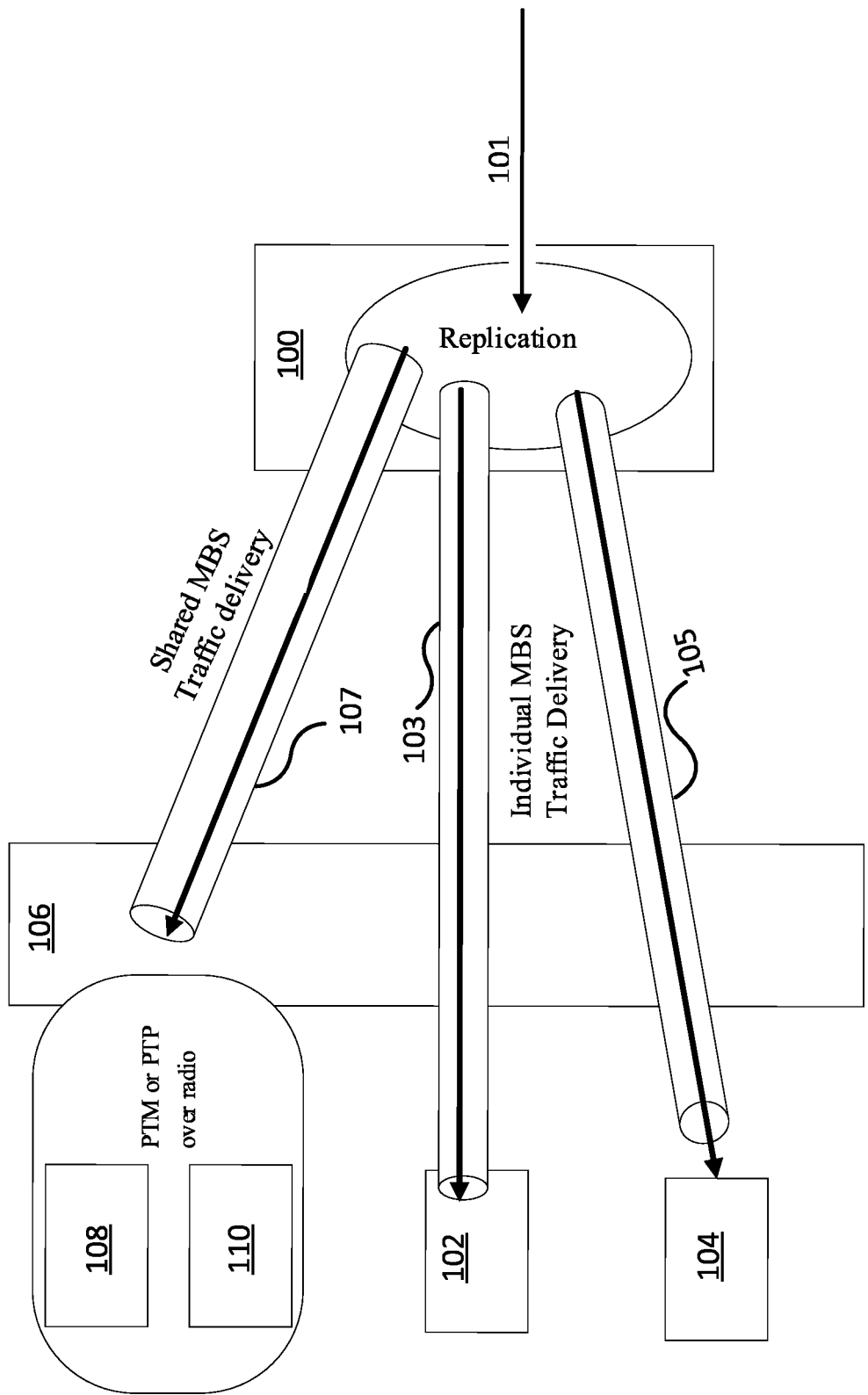
FIG. 1 is a schematic diagram illustrating various delivery methods for delivering the MBS traffic in the 5G System (5GS) according to an example implementation of the present disclosure.

The acronyms in the present application are defined as follows and unless otherwise specified, the acronyms have the following meanings:

| Acronym | Full name |
| --- | --- |
| 3GPP | 3rd Generation Partnership Project |
| 5G | 5th generation |
| ACK | Acknowledgement |
| AM | Acknowledgement mode |
| ARQ | Automatic Repeat Request |
| BCCH | Broadcast Control Channel |
| BL | Bandwidth reduced Low complexity |
| BS | Base Station |
| BSR | Buffer Status Report |
| BWP | Band Width Part |
| CA | Carrier Aggregation |
| CC | Component Carriers |
| CCCH | Common Control CHannel |
| CE | Control Element |
| CG | Cell Group |
| CN | Core Network |
| CORESET | Control Resource Set |
| C-RNTI | Cell-Radio Network Temporary Identifier |
| CRC | Cyclic Redundancy Check |
| DC | Dual Connectivity |
| DCI | Downlink Control Information |
| DL | Downlink |
| DL-SCH | Downlink Shared Channel |
| DRB | Data Radio Bearer |
| E-UTRA | Evolved Universal Terrestrial Radio Access |
| E-UTRAN | Evolved Universal Terrestrial Radio Access Network |
| G-RNTI | Group Radio Network Temporary Identifier |
| HARQ | Hybrid Automatic Repeat Request |
| IE | Information Element |
| L1 | Layer 1 |
| LCG | Logical Channel Group |
| LCH | Logical Channel |
| LTE | Long Term Evolution |
| MAC | Medium Access Control |
| MBMS | Multimedia Broadcast Multicast Service |
| MBS | Multicast/Broadcast Service |
| MBSFN | Multicast Broadcast Single Frequency Network |
| MCE | Multi-cell/multicast Coordination Entity |
| MCG | Master Cell Group |
| MCH | Multicast Channel |
| MCCH | Multicast Control Channel |
| SC-MCCH | Single Cell Multicast Control Channel |
| MRB | NIBS Radio Bearer |
| MR-DC | Multi-RAT Dual Connectivity |
| MSG | Message |
| MTCH | Multicast Traffic Channel |
| NB-IoT | Narrow Band Internet of Things |
| NDI | New Data Indicator |
| NR | New RAT/Radio |
| NUL | Normal Uplink |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical Layer |
| PSCell | Primary SCell |
| PTM | Point to Multipoint |
| PTP | Point to Point |
| PUCCH | Physical Uplink Control Channel |
| PUSCH | Physical Uplink Shared Channel |
| RA | Random Access |
| RLC | Radio Link Control |
| RNTI | Radio Network Temporary Identifier |
| RRC | Radio Resource Control |
| SCell | Secondary Cell |
| SCG | Secondary Cell Group |
| SC-MCCH | Single Cell Multicast Control Channel |
| SC-MTCH | Single Cell Multicast Traffic Channel |
| SC-PTM | Single Cell Point to Multipoint |
| SC-MRB | Single Cell Multimedia Broadcast Multicast Service Point to Multipoint Radio Bearer |
| SC-RNTI | Single Cell Radio Network Temporary Identifier |
| SDAP | Service Data Adaptation Protocol |
| SDU | Service Data Unit |
| SIB | System Information Block |
| SR | Scheduling Request |
| SRB | Signaling Radio Bearer |

-continued

| Acronym | Full name |
|---|---|
| SpCell | Special Cell |
| SPS | Semi Persistent Scheduling |
| SUL | Supplementary Uplink |
| TA | Timing Advance |
| TAG | Timing Advance Group |
| TB | Transport Block |
| TMGI | Temporary Mobile Group Identity |
| TR | Technical Report |
| TRP | Transmission/Reception Point |
| TS | Technical Specification |
| UE | User Equipment |
| UL | Uplink |
| UL-SCH | Uplink Shared Channel |
| UM | Unacknowledged Mode |
| WI | Work Item |
| 5GS | 5G System |

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "in one example" may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuitry (ASIC), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

Examples of some selected terms are provided as follows.

UE: The UE may be referred to as a PHY/MAC/RLC/PDCP/SDAP/RRC entity. The PHY/MAC/RLC/PDCP/SDAP/RRC entity may be referred to as a UE.

Network (NW): The NW may be a network node, a TRP, a cell (e.g., SpCell, PCell, PSCell, and/or SCell), an eNB, a gNB, and/or a base station.

Serving Cell: A PCell, a PSCell, or an SCell. The serving cell may be an activated or a deactivated serving cell.

Special Cell (SpCell): For Dual Connectivity operation, the Special Cell may refer to the PCell of the MCG or the PSCell of the SCG depending on if the MAC entity is associated to the MCG or the SCG, respectively. Otherwise, the Special Cell may refer to the PCell. A Special Cell may support PUCCH transmission and contention-based Random Access and may be always activated.

Component Carrier (CC): The CC may be PCell, PSCell, and/or SCell.

Broadcast/multicast HARQ process: A HARQ process that is allocated to DL resources that may be specifically used for transmission of MBSs. The MBS HARQ process may be used for identifying a DL resource (for transmitting a TB/MAC PDU). The DL resource may map to an MBS DL Transport channel (e.g., BCH, MCH) and/or MBS DL LCH (e.g., MTCH, MCCH, BCCH, SC-MTCH, SC-MCCH).

Soft buffer: One soft buffer may correspond to a DL (MBS) HARQ process.

An UL grant may be used to indicate a PUSCH resource. The PUSCH resource may also be referred to as UL-SCH resource. In the case of DC or MR-DC, an MBS may be supported by both the Master Node and the Secondary Node. The configuration related to the MBS may be delivered through SRB1 or SRB3. A TB may also be referred to as a MAC PDU. The configurations in the UL BWP (e.g., configuration of UL resource for transmission of control or data traffic) may be applied to both NUL and SUL. An NR MBS radio bearer may be used to receive MBS(s) in NR, and a UE may need to establish an NR MBS radio bearer for the reception of (DL) MBS(s). One NR MBS radio bearer may be mapped to one or more LCHs. One NR MBS radio bearer may be used for reception of one or more MBSs. An MBS may be identified via a TMGI or a session ID (e.g., sessionId) of the MBS. A PDCCH/search space may also be referred to as a CORESET. An NR MBS radio bearer may be referred to as an MRB in the present disclosure.

In a multi-RAT connectivity scenario, the UE may receive the MBS configuration by reading the broadcast system information directly. In this scenario, the secondary node may be either eNB or gNB. The MBS configuration may refer to both the MBMS configuration in LTE E-UTRA and/or MBS configuration in 5G NR. For example, the configurations that may be provided by the network via broadcast system information may be referred to as MBS configurations. For an MBS configuration that is configured via dedicated RRC signaling, the master node may forward the MBS configuration generated by the secondary node. The secondary node may forward the MBS configuration generated by the master node. The MBS configuration may refer to both the MBMS configuration in LTE E-UTRA and/or MBS configuration in 5G NR.

An MBS common frequency resource may be configured within the frequency range of a UE's DL BWP. A UE may receive scheduling information that schedules one or multiple MBSs and/or DL data for one or multiple MBSs (e.g., one or more MAC PDUs, each of which includes one or more MBS data) from a configured MBS common frequency resource. An MBS common frequency resource may also be referred to as an MBS frequency resource in the present disclosure.

As described in the present disclosure, a new transmission may be referred to as an initial transmission. A DL assignment may be included in DCI (with DCI format 1). Moreover, the DL assignment may be associated with a C-RNTI and/or a G-RNTI. That is, the DCI corresponding to the DL assignment may be CRC scrambled by a C-RNTI and/or a G-RNTI (e.g., the DCI with CRC scrambled by a C-RNTI and/or a G-RNTI). Further, the DL assignment may schedule a DL resource for the reception of unicast and/or DL MBS data. For example, a DL assignment associated with a G-RNTI may be used to schedule a DL resource for receiving DL MBS data from the network. The DL MBS data may be received by a group of UEs that share the same G-RNTI associated with the DL assignment.

A DL assignment associated with a C-RNTI may also be used to schedule a DL resource for receiving DL MBS data. Given this, the DL MBS data may be received by a group of UEs and/or a single UE with the C-RNTI associated with the DL assignment.

In some cases, a DL assignment may refer to scheduling information that schedules certain radio resource(s) for receiving DL data from the network.

A SPS group common PDSCH may be used for transmitting MBS. One SPS group common PDSCH configuration may correspond to one or more MBSs. An SPS group common PDSCH configuration may have at least one of the following features (a) to (e):

(a) Configured by RRC per Serving Cell and per BWP. Multiple SPS group common PDSCH configurations may be active simultaneously in the same BWP. Activation and deactivation of an SPS group common PDSCH configuration may be independent among the Serving Cells.

(b) For an SPS group common PDSCH configuration, a DL assignment is provided by a PDCCH, and stored or cleared based on L1 signalling indicating the SPS group common PDSCH configuration (de)activation.

(c) RRC may configure certain parameters for an SPS group common PDSCH configuration. The parameters may include at least one of the following:

cs-RNTI: CS-RNTI for activation, deactivation, and retransmission. Alternatively, G-RNTI may be configured in an SPS group common PDSCH configuration for activating/deactivating the SPS group common PDSCH configuration;

nrofHARQ-Processes: the number of configured HARQ processes for SPS;

harq-ProcID-Offset: offset of HARQ process for SPS;

periodicity: periodicity of configured DL assignment for SPS; and

MBS ID(s) (e.g., G-RNTI, TMGI, MBS session ID, LCID, bearer ID, QoS flow ID, etc.): the identity(s) of the MBS(s) that a UE may receive using the SPS group common PDSCH configuration.

(d) When the SPS group common PDSCH configuration is released by upper layers, all of the corresponding configurations shall be released.

(e) After a DL assignment is configured for SPS, the MAC entity may consider sequentially that the Nth DL assignment occurs in the slot for which:

(numberOfSlotsPerFrame×SFN+slot number in the frame)=[(numberOfSlotsPerFrame×SFNstart time+slotstart time)+N×periodicity×numberOflotsPerFrame/10] modulo (1024×numberSlotsPerFrame)

where SFNstart time and slotstart time are the SFN and slot, respectively, of the first transmission of PDSCH where the configured DL assignment was (re-)initialised.

A UE may (be expected to) monitor the scheduling information that schedules one or more MBSs only if it is interested in receiving the one or more MBSs. Similarly, a UE may (be expected to) monitor the DL data of one or more MBSs only if it is interested in receiving the one or more MBSs.

In some implementations, a retransmission timer (e.g., timer-retransmission) and/or a timer for a new transmission (e.g., timer-new-transmission) may be used to control the UE's behaviour of monitoring scheduling information that schedules MBS data transmission only. It may not be used to control the UE's behaviour of monitoring scheduling information that schedules unicast data transmission(s) from the network.

In some implementations, the retransmission timer and/or the new transmission timer may be used to control the UE's behaviour of monitoring a DL resource for scheduling the MBS data transmission only. Given this, the retransmission timer and/or the new transmission timer may not be used to control the UE's behaviour of monitoring a DL resource for the unicast data transmission.

An LTE MBMS aims to provide an efficient mode of delivery for both broadcast and multicast services over the core network. The broadcast service may be provided via a DL-only PTM transmission from the network to multiple UEs. The content of the broadcast service may be transmitted once to all the UEs in a geographical area and users may be free to choose whether or not to receive the content of the broadcast service. The multicast service may be provided via a DL-only PTM transmission from the network to a managed group of UEs. The content of the multicast service may be transmitted once to the whole managed group and only the users belonging to the managed group can receive the content of the multicast service. According to the 3GPP TS 36.300 V16.3.0, a UE may receive the MBMS (from the network) in the RRC_IDLE state. Further, a UE may receive the MBMS (from the network) in the RRC_CONNECTED state if the UE is not a NB-IoT UE, BL UE or a UE in an enhanced coverage. Transmission of the MBMS in the E-UTRAN may use either MBSFN transmission or SC-PTM transmission. The MCE may make the decision on whether to use SC-PTM or MBSFN for each MBMS session.

The LTE MBMS may be transmitted using an SC-PTM transmission. The MBMS transmitted using the SC-PTM transmission may have the following characteristics (a)-(g):

(a) The MBMS may be transmitted in the coverage of a single cell.

(b) One SC-MCCH and one or more SC-MTCHs may be mapped on a DL-SCH. The DL-SCH may be mapped to a PDSCH. The SC-MCCH and the SC-MTCH may be logical channels. The SC-MCCH may be a PTM DL channel used for transmitting MBMS control information (e.g., SCPTMConfiguration message as specified in the 3GPP TS 36.331 V16.2.0) from the network to the UE, for one or more SC-MTCHs. The SC-MCCH may be only used by UEs that receive or are interested in receiving MBMS using SC-PTM. The SC-MTCH is a PTM downlink channel used for transmitting traffic data from the network to the UE using SC-PTM transmission. The SC-MTCH may be only used by UEs that receive MBMS using SC-PTM.

(c) The SC-MCCH and/or the SC-MTCH may be mapped on SC-MRB. The SC-MRB may be a radio bearer used for reception of MBMS service (transmitted using SC-PTM transmission).

(d) Scheduling may be done by the eNB.

(e) The SC-MCCH and the SC-MTCH transmissions (e.g., the PDSCH used for transmission of SC-MCCH information and the PDSCH used for transmission of SC-MTCH information) are each scheduled/indicated by a logical channel specific RNTI on PDCCH (e.g., there is a one-to-one mapping between TMGI and G-RNTI used for the reception of the DL-SCH to which an SC-MTCH is mapped).

The PDCCH (DCI) associated with an SC-RNTI (e.g., the DCI with CRC scrambled by an SC-RNTI) may be used to indicate the transmission of the SC-MCCH (e.g., the PDSCH on which the SC-MCCH is mapped).

The PDCCH (DCI) associated with a G-RNTI (e.g., the DCI with CRC scrambled by a G-RNTI) may be used to indicate the transmission of the SC-MTCH (e.g., the PDSCH on which the SC-MTCH is mapped).

The value of the SC-RNTI may be "FFFB", which is a value represented in hexadecimal, as specified in the 3GPP TS 36.321 V16.2.0.

The value of the G-RNTI and a (1-to-1) mapping between the G-RNTI and its respective TMGI/MBMS session is indicated via the SCPTMConfguration message (e.g., SC-MCCH). A single SCPIMConfiguration message may indicate a list of one or more G-RNTIs and their respective TMGIs/MBMS sessions.

(f) A single transmission may be used for the DL-SCH (i.e., neither blind HARQ repetitions nor RLC quick repeat) on which the SC-MCCH or the SC-MTCH is mapped.

(g) The SC-MCCH and the SC-MTCH may use the RLC-UM.

The MBS may be delivered via at least one of a unicast transmission and a multicast transmission. The broadcast/multicast service may be delivered from a single data source (e.g., the MBS server) to multiple UEs. Multiple delivery methods may be used to deliver the MBS traffic in the 5GS.

FIG. 1 is a schematic diagram illustrating various delivery methods for delivering the MBS traffic in the 5GS according to an example implementation of the present disclosure. From the 5G CN 100 point of view, the following two delivery methods (a) and (b) may be applied to the MBS.

(a) A 5GC individual MBS traffic delivery method: The 5G CN 100 may receive a single copy of MBS data packets 101 and may deliver separate copies of those MBS data packets 101 to individual UEs via per-UE PDU sessions. For example, the 5G CN 100 may receive a single copy of MBS data packets 101 and may deliver separate copies of those MBS data packets 101 to the UE 102 and UE 104 via the PDU session 103 and the PDU session 105, respectively. Hence, for each UE, one PDU session may be required to be associated with an MBS session. The 5GC individual MBS traffic delivery method may be referred to as a unicast delivery method.

(b) A 5GC shared MBS traffic delivery method: The 5G CN 100 may receive a single copy of MBS data packets 101 and may deliver a single copy of those MBS data packets 101 to a gNB (in the RAN 106) via the MBS session 107. The gNB (in the RAN 106) may deliver the single copy of those MBS data packets to one or more UEs (e.g., UEs 108 and 110).

From the RAN 106 point of view (in the case of the 5GC shared MBS traffic delivery method), the following two transmission schemes (a) and (b) may be used for transmission of the MBS packet flows over the radio (e.g., between the gNB (in the RAN 106) and the UEs 108 and 110).

(a) A PTP transmission scheme: the gNB (in the RAN 106) may deliver separate copies of the MBS data packets over the radio to each individual UE (e.g., the UE 108 or 110).

(b) A PTM transmission scheme: a gNB (in the RAN 106) may deliver a single copy of the MBS data packets over the radio to a set of UEs (e.g., the UEs 108 and 110). The PTP or PTM delivery method (with the 5GC shared delivery method) and the 5GC individual MBS traffic delivery method may be used at the same time for an MBS session.

For the 5GC individual MBS traffic delivery method, the transmission of an MBS session over the radio may be performed on a PDCCH for a C-RNTI and a DL-SCH MAC PDU may be received.

For the PTP transmission scheme, the DCI associated with a C-RNTI (e.g., the DCI with CRC scrambled by the C-RNTI) may be transmitted on a PDCCH for scheduling of a UE-specific PDSCH in the DL. The UE-specific PDSCH (with CRC scrambled by the C-RNTI) may include an MBS data packet. The PTP transmission scheme may also refer to a unicast transmission from the network.

For the PTM transmission scheme, the DCI associated with a G-RNTI (e.g., the DCI with CRC scrambled by the G-RNTI) may be transmitted on a PDCCH for scheduling of a group-common PDSCH in the DL. The group-common PDSCH (with CRC scrambled by the G-RNTI) may include the MBS data packets. The PTM transmission scheme may also be referred to as PTM transmission scheme 1 or may be referred to as a multicast transmission from the network.

Further, for the PTM transmission scheme, the DCI associated with a C-RNTI may be transmitted on a PDCCH for scheduling of a group-common PDSCH in the DL. The group-common PDSCH (with CRC scrambled by the G-RNTI) may include an MBS data packet. This transmission scheme may also be referred to as PTM transmission scheme 2 or may be referred to as a multicast transmission from the network.

The PTM transmission scheme may have the same feature as the LTE MBMS transmitted using the SC-PTM transmission. That is, a G-RNTI may be associated with one or multiple MBSs. Moreover, each MBS may be associated with an MBS ID (e.g., TMGI, MBS session ID, etc.). In some implementations, the network may transmit a message that includes a list of one or multiple G-RNTIs and their respective MBSs (e.g., TMGI, MBS session ID, etc.) to one or multiple UEs. Hence, a UE may maintain multiple G-RNTIs, and multiple UEs may share the same G-RNTI.

Dynamic Switching Indication

According to the NR MBS working item, it has been agreed to specify support for dynamic change of MBS delivery between the PTM transmission scheme and the PTP transmission scheme with service continuity for a given UE. That is, the network may dynamically change the MBS provisioning to a UE between the PTM transmission scheme and the PTP transmission scheme. Moreover, it is agreed that the network makes the decision for the dynamic switching. Whenever the network makes the decision for dynamic switching from the PTP transmission scheme to the PTM transmission scheme and/or vice versa for one or more MBSs, a dynamic switching indication may be transmitted to the UE(s) that is receiving the one or more MBSs.

One 5G protocol entity may act as an anchor entity to support dynamic switching between the PTP transmission scheme and the PTM transmission scheme, e.g., a PDCP entity, RLC entity, SDAP entity, etc.

Figure 2:
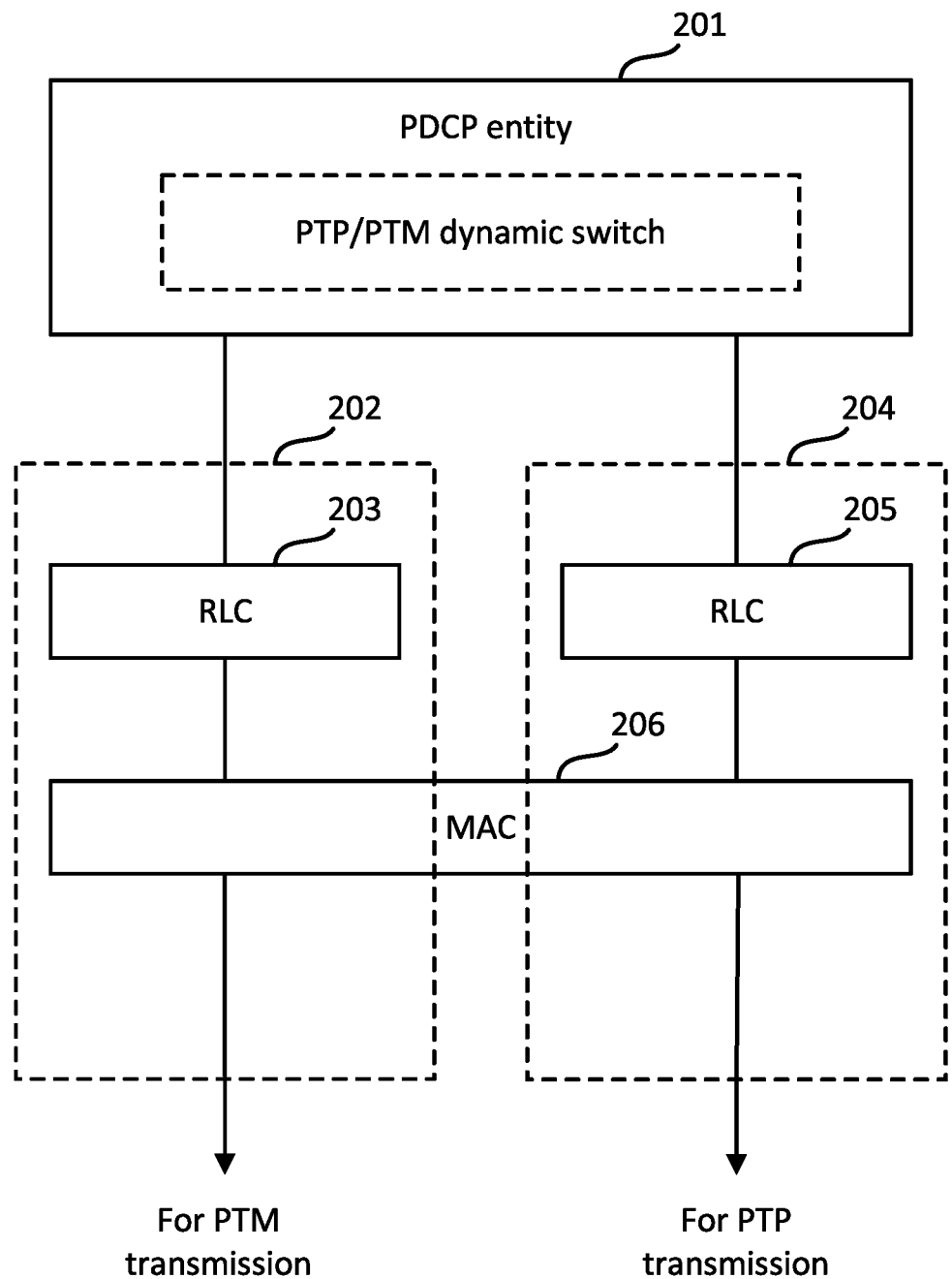
FIG. 2 is a schematic diagram illustrating an example of a UE having a PDCP entity, as an anchor entity to support dynamic switching between the Point to Point (PTP) transmission scheme and the Point to Multipoint (PTM) transmission scheme according to an implementation of the present disclosure.

FIG. 2 is a schematic diagram illustrating an example of a UE having a PDCP entity 201, as an anchor entity to support dynamic switching between the PTP transmission scheme and the PTM transmission scheme according to an implementation of the present disclosure. In the present example, the UE is configured with a PDCP entity 201 that is associated with a first RLC entity 203 and a second RLC entity 205. Both of the first RLC entity 203 and the second RLC entity 205 are associated with the same MAC entity 206. The data delivering path formed by the first RLC entity 203 and the MAC entity 206 is referred to as a PTM leg 202 for dealing with data transmitted under the PTM transmission scheme (e.g., PTM transmission scheme 1 or PTM transmission scheme 2) from the network. The data delivering path formed by the second RLC entity 205 and the MAC entity 206 is referred to as a PTP leg 204 for dealing with data transmitted under the PTP transmission scheme from the network.

For example, for PTM transmission scheme 1, a UE may use the PTM leg 202 to receive scheduling information (e.g., DCI associated with a G-RNTI) that schedules a group-common PDSCH. For PTM transmission scheme 2, the UE may also use the PTM leg 202 to receive scheduling information (e.g., DCI associated with C-RNTI) that schedules a group-common PDSCH. On the other hand, for the PTP transmission scheme, the UE may use the PTP leg 204 to receive scheduling information (e.g., DCI associated with a C-RNTI) that schedules a UE-specific PDSCH. Here, the group-common/UE-specific PDSCH may carry DL data from the MBS radio bearer that associates with the PDCP entity 201.

In the present disclosure, an MRB may associate with a PDCP entity. The PDCP entity that associates with the MRB may associate with either one or two RLC entities. Each RLC entity may operate in either an RLC Unacknowledged Mode (RLC-UM) or an RLC Acknowledged Mode (RLC-AM). In some implementations, the PDCP entity may associate with one RLC-UM entity for PTP transmission. In some implementations, the PDCP entity may associate with one RLC-AM entity for PTP transmission. In one case, the PDCP entity may associate with one RLC-UM entity for PTM transmission. In some implementations, the PDCP entity may associate with two RLC-UM entities, one for PTP transmission and the other for PTM transmission. In some implementations, the PDCP entity may associate with one RLC-UM entity for PTM transmission and one RLC-AM entity for PTP transmission. Taking FIG. 2 as an example, the PDCP entity 201 may associate with one RLC entity 203 for PTM transmission and one RLC entity 205 for PTP transmission. Here, the RLC entity 205 for PTP transmission may either operate in RLC-AM or RLC-UM, and the RLC entity 203 for PTM transmission may operate in RLC-UM. Moreover, in FIG. 2, the RLC entity 203 for PTM transmission and the RLC entity 205 for PTP transmission may both associate with the MAC entity 206.

In some implementations, different PDCCH/CORESET/search space configurations may be associated with different transmission schemes (e.g., PTP transmission scheme, PTM transmission scheme 1, PTM transmission scheme 2). Hence, if a UE receives a dynamic switching indication that indicates change of transmission scheme (e.g., from PTM transmission scheme to PTP transmission scheme or vice versa), the UE may stop monitoring at the PDCCH/CORESET/search space/MBS common frequency resource that corresponds to the transmission scheme before receiving the dynamic switching indication. Moreover, the UE may start monitoring at the PDCCH/CORSET/search space/MBS common frequency resource that corresponds to the transmission scheme indicated by the dynamic switching indication.

Figure 3:
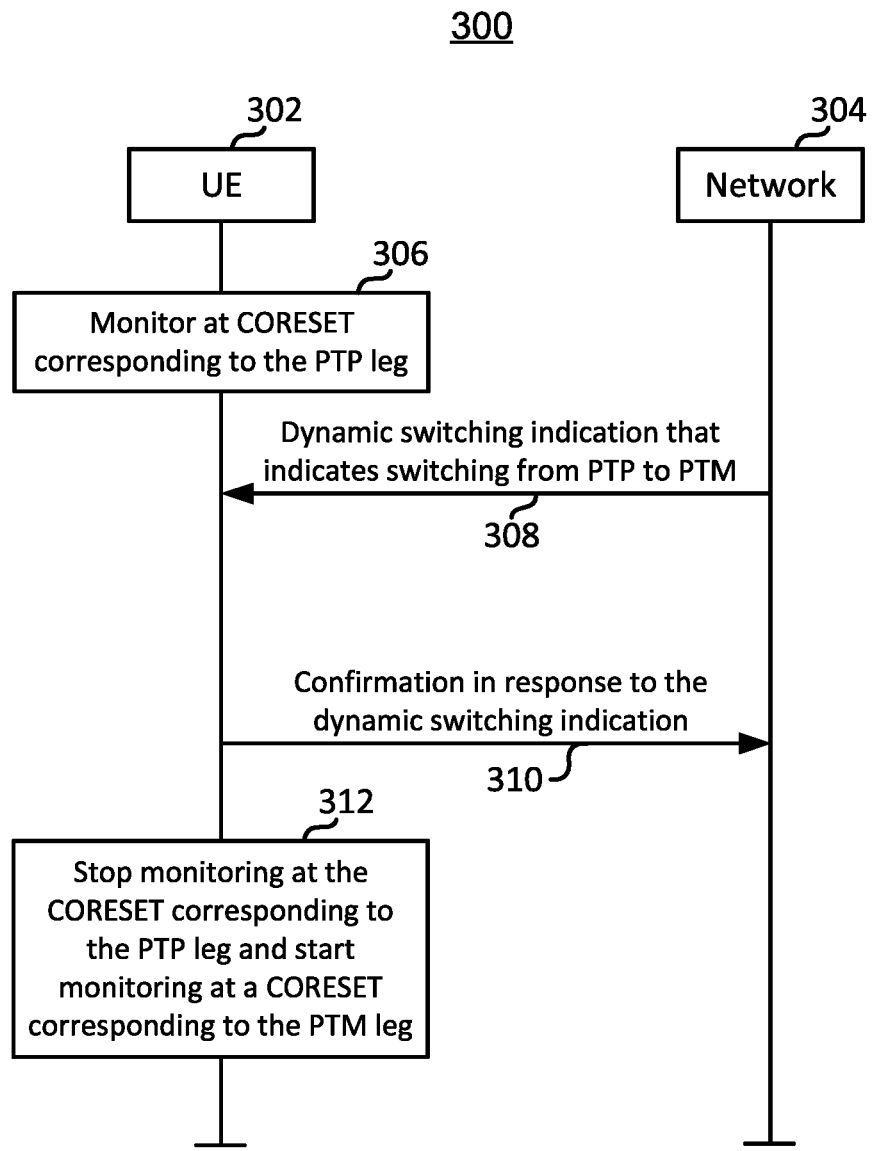
FIG. 3 is a flowchart of a method in which a UE switches its monitoring behavior from a PTP leg to a PTM leg based on a dynamic switching indication according to an implementation of the present disclosure.

FIG. 3 is a flowchart of a method 300 in which a UE 302 switches its monitoring behavior from the PTP leg to the PTM leg based on a dynamic switching indication according to an implementation of the present disclosure. As illustrated in FIG. 3, the UE 302 may first monitor at a CORESET/search space/PDCCH corresponding to the PTP leg (in action 306). Then, if the UE 302 receives from the network 304 a dynamic switching indication that indicates a change of transmission scheme from the PTP transmission scheme to the PTM transmission scheme (in action 308), the UE 302 may transmit a confirmation in response to the dynamic switching indication to the network 304 (in action 310) and stop monitoring at the CORESET corresponding to the PTP leg and start monitoring at a CORESET corresponding to the PTM leg. In some other implementations, the UE 302 may not transmit any confirmation to the network 304 in response to the dynamic switching indication. That is, the UE 302 may forgo performing action 310 when performing the method 300.

Figure 4:
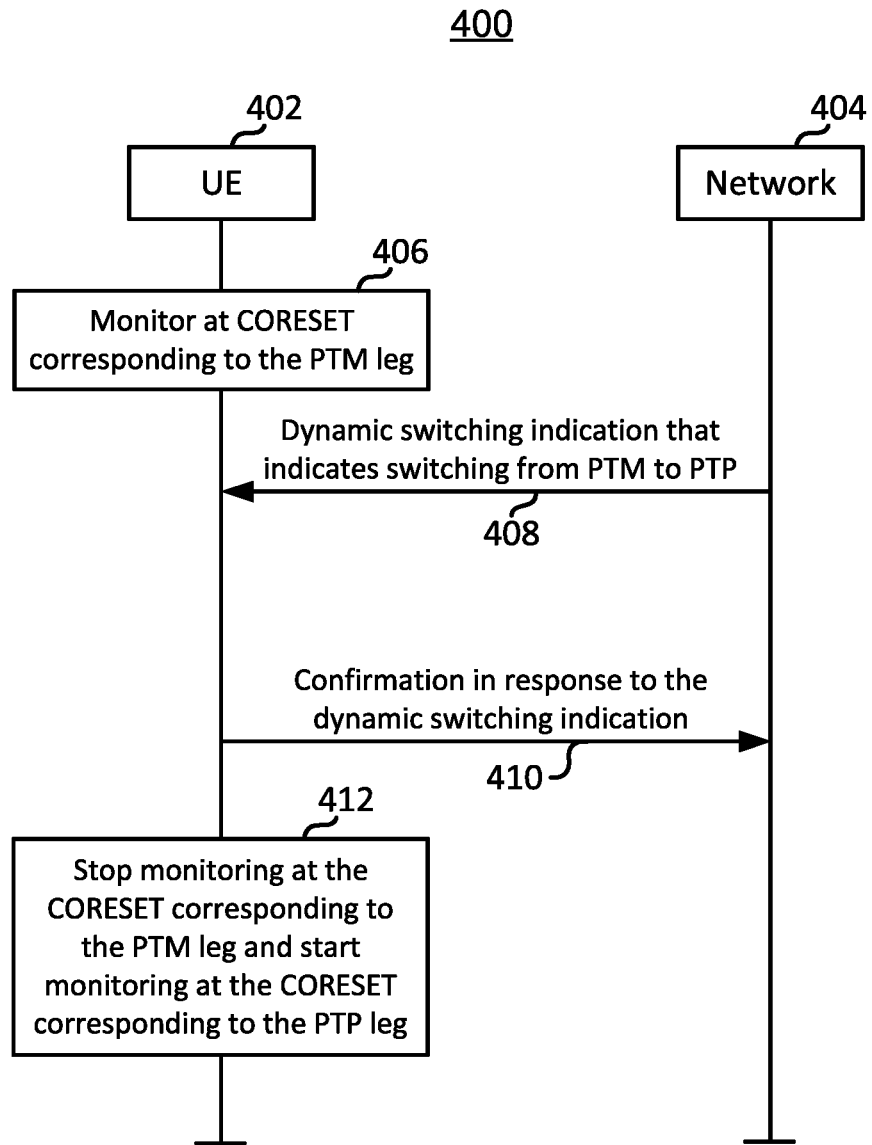
FIG. 4 is a flowchart of a method in which a UE switches its monitoring behavior from the PTM leg to the PTP leg based on a dynamic switching indication according to an implementation of the present disclosure.

FIG. 4 is a flowchart of a method 400 in which a UE 402 switches its monitoring behavior from the PTM leg to the PTP leg based on a dynamic switching indication according to an implementation of the present disclosure. The UE 402 may monitor at a CORESET corresponding to the PTM leg (in action 406). Then, if the UE 402 receives from the network 404 a dynamic switching indication that indicates a change of transmission scheme from the PTM transmission scheme to the PTP transmission scheme (in action 408), the UE 402 may transmit a confirmation in response to the dynamic switching indication to the network 404 (in action 410) and stop monitoring at the CORESET corresponding to the PTM leg and start monitoring at a CORESET corresponding to the PTP leg. In some other implementations, the UE 402 may not transmit any confirmation to the network 404 in response to the dynamic switching indication. That is, the UE 402 may forgo performing action 410 when performing the method 400.

In some implementations, different RNTI's may be associated with different transmission schemes (e.g., the G-RNTI is associated with the PTM transmission scheme, and the C-RNTI is associated with the PTP transmission scheme). Hence, if a UE receives a dynamic switching indication that indicates change of transmission scheme (e.g., from PTM transmission scheme to PTP transmission scheme or vice versa), the UE may stop PDCCH monitoring for the specific RNTI that corresponds to the transmission scheme before receiving the dynamic switching indication. Moreover, the UE may start PDCCH monitoring for the RNTI that corresponds to the transmission scheme indicated by the dynamic switching indication.

It has been agreed in NR Rel-17 MBS WI that a UE may receive an MBS from the network using either the PTM transmission scheme (e.g., PTM transmission scheme 1 and/or PTM transmission scheme 2) or the PTP transmission scheme. However, the signaling for the reception of scheduling information under PTM transmission scheme and PTP transmission scheme is not defined. Hence, the present disclosure introduces some signaling designs for this purpose.

Another objective of NR Rel-17 MBS WI is to consider the reliability aspect of NR MBS, since some MBSs may have high reliability requirements (e.g., MBS for emergency use). RAN1 has agreed to support HARQ-ACK feedback mechanisms for NR Rel-17 MBS. Moreover, both ACK/NACK based HARQ feedback mechanism and NACK-only based HARQ feedback mechanism may be supported in NR Rel-17 MBS. Based on the feedback from a UE (or a group of UEs), the network may determine whether to retransmit the MBS data. Hence, the present disclosure introduces some new UE behaviors upon (or after) missing scheduling information and/or (data of) one or multiple MBSs. For instance, the UE may need to start monitoring at a specific location for potential retransmission scheduling after sending a HARQ feedback to the network.

Configuration of one or more DL resources for the MBS reception.

In some implementations, the network may (only) transmit scheduling information (e.g., DL assignment) that schedules one or more MBSs and/or DL data corresponding to one or more MBSs (e.g., MAC PDU(s) that includes one or more MBS data) to a UE. The scheduling information may be for PTM transmission scheme 1, PTM transmission scheme 2, and/or PTP transmission. For example, the scheduling information for PTM transmission scheme 1 may be a DL assignment associated with a G-RNTI, where the DL assignment may schedule a group-common PDSCH. The scheduling information for PTM transmission scheme 2 may be a DL assignment associated with a C-RNTI, where the DL assignment may schedule a group-common PDSCH. The scheduling information for PTP transmission may be a DL assignment associated with a C-RNTI, where the DL assignment may schedule a UE-specific PDSCH. The PDSCH that is scheduled by the scheduling information may be used to transmit DL data corresponding to one or more MBSs (e.g., a MAC PDU that includes one or more MBS data).

In some implementations, the network may (only) configure a UE with an SPS group common PDSCH configuration, a PS, and/or a dynamic scheduling.

The scheduling information, the SPS group common PDSCH configuration, the PS, and/or the dynamic scheduling described above may be transmitted/configured on at least one of the following locations (e.g., Location 1 to Location 4).

Location 1: A Specific BWP

The specific BWP may (only) be the UE's default DL BWP, initial DL BWP, first active DL BWP, dormant DL BWP, an MBS BWP, and/or BWP with a specific BWP ID.

For example, the network may transmit scheduling information that schedules one or multiple MBSs on either the UE's default DL BWP, initial DL BWP, first active DL BWP, dormant DL BWP, an MBS BWP, and/or BWP with a specific BWP ID.

For example, the network may transmit (data of) one or multiple MBSs (e.g., one or more MAC PDUs, each of which includes one or more MBS data) on either the UE's default DL BWP, initial DL BWP, first active DL BWP, dormant DL BWP, an MBS BWP, and/or BWP with a specific BWP ID.

For example, the network may only configure an MBS common frequency resource and/or SPS group common PDSCH configuration in the UE's default DL BWP, initial DL BWP, first active DL BWP, dormant DL BWP, an MBS BWP, and/or BWP with a specific BWP ID.

In some implementations, the specific BWP may (only) be a DL BWP that is explicitly configured by the network (or preconfigured by the UE).

For example, the specific DL BWP may be configured, by the network, via a dedicated signalling (e.g., an RRCReconfiguration message).

For example, the specific DL BWP may be configured, by the network, via system information (e.g., an MBS specific system information). The configuration (e.g., parameters related to frequency domain location and bandwidth, or subcarrier spacing to be used, or cyclic prefix to be used) of the specific DL BWP may be provided in SIB1 or MBS specific system information. The specific DL BWP may be the initial MBS BWP, partially overlapped with the initial MBS BWP, or not overlapped with the initial MBS BWP. In another example, if the configuration of the specific DL BWP is absent or is not provided, the UE may receive the interested MBS data on the initial DL BWP (or default DL BWP).

For example, the specific DL BWP may be configured, by the network, via MBS specific system information.

For example, the specific DL BWP may be implicitly indicated (e.g., based on whether one or more parameters are associated with a DL BWP).

For example, the network may indicate that a BWP corresponds to a specific BWP via the presence of an indication (with a specific value). If the indication is presented (with a specific value), the UE may consider the BWP as a specific BWP. In contrast, if the indication is not presented (with a specific value), the UE may not consider the BWP as a specific BWP.

For example, the specific DL BWP may not be used for transmission of DL unicast data packets (e.g., DRB). The CORESET/PDCCH/search space for reception of scheduling information that schedules DL resource for unicast traffic (e.g., data corresponding to DRB) may not be configured in the specific DL BWP.

In some implementations, the mapping between a BWP and one or multiple MBSs may be configured by the network. When the mapping is provided, the UE (that is interested in the one or multiple MBSs) may be expected to monitor, on the BWP, the scheduling information that schedules one or multiple MBSs and/or DL data corresponding to one or more MBSs (e.g., MAC PDU(s) that includes one or more MBS data).

For example, the UE may be expected to monitor, on the BWP, the scheduling information that schedules one or multiple MBSs and/or DL data corresponding to one or more MBSs (e.g., MAC PDU(s) that includes one or more MBS data) once the mapping is provided via unicast DL signalling (e.g., RRC signalling). That is, once the mapping is provided via unicast DL signalling, the UE may start monitoring after some other conditions are satisfied; for example, the monitoring is started once the UE's NAS layer triggers AS layer for corresponding monitoring.

For example, the network may configure/provide the mapping between a BWP ID and MBS IDs (e.g., G-RNTI, TMGI, MBS session ID, LCID, bearer ID, QoS flow ID, etc.) to the UE via an explicit signalling. Moreover, the mapping may be configured in a dedicated RRC signalling (e.g., a RRC message). That is, the UE may be provided with the G-RNTI on corresponding BWP configurations directly, then they have linkage with each other. For example, if G-RNTI is provided in an IE that configures a BWP, (e.g., BWP-DownlinkCommon IE and/or BWP-DownlinkDedicated IE) the G-RNTI may be considered to be mapped to the BWP.

For example, the network may configure/provide the mapping between a BWP ID and MBS IDs (e.g., G-RNTI, TMGI, MBS session ID, LCID, bearer ID, QoS flow ID, etc.) to the UE via a mapping table (e.g., Table1). Moreover, the mapping table may be configured in a broadcast system information (e.g., SIB) or dedicated signalling (e.g., a RRC message or MAC CE). Note that if a mapping table, which maps a BWP to one or multiple G-RNTIs, is provided, the UE may also need to have the knowledge about the mapping between a G-RNTI and one or more MBSs. Hence, the network may also provide the mapping between G-RNTI and one or more MBSs (e.g., the mapping between a G-RNTI and one or more TMGI/MBS session IDs to the UE).

In the example in Table1, BWP ID 1 may be used to receive scheduling information that schedules MBS1 and/or DL data corresponding to MBS1, and BWP ID 2 may be used to receive scheduling information that schedules MBS 2, 3, and 4 and/or DL data corresponding to MBS2, 3 and 4.

TABLE 1

A mapping table that maps each BWP to one or more MBSs.

| BWP ID | MBS ID |
|---|---|
| 1 | G-RNTI for MBS1 (e.g., G-RNTI#1) |
| 2 | G-RNTI for MBS 2 and 3 (e.g., G-RNTI#2) |
|  | G-RNTI for MBS4 (e.g., G-RNTI#3) |

Location 2: An MBS Common Frequency Resource

In some implementations, the MBS common frequency resource may be a frequency resource that is within the frequency range of a BWP configured for a UE. For example, an MBS common frequency resource may be used for transmitting scheduling information that schedules one or more MBSs and/or DL data corresponding to one or more MBSs (e.g., MAC PDU(s) that includes one or more MBS data). The CORESET/PDCCH/search space for reception of scheduling information that schedules one or multiple MBSs (e.g., data corresponding to MBS radio bearer) may only be configured in an MBS common frequency resource. For example, an MBS common frequency resource may not be used for transmission of DL unicast data packets (e.g., DRB). The CORESET/PDCCH/search space for reception of scheduling information that schedules a DL resource for unicast traffic (e.g., data corresponding to DRB) may not be configured in an MBS common frequency resource.

In some implementations, the MBS common frequency resource may be explicitly configured by the network. For example, the network may configure an MBS common frequency resource via a dedicated signalling (e.g., an RRCReconfiguration message). For example, an MBS common frequency resource may be configured in an IE that configures a UE's DL BWP (e.g., BWP-Downlink IE, BWP-DownlinkCommon IE, BWP-DownlinkDedicated IE, etc.). In addition, each BWP configured to the UE may be associated with one or more common frequency resources.

Figure 5:
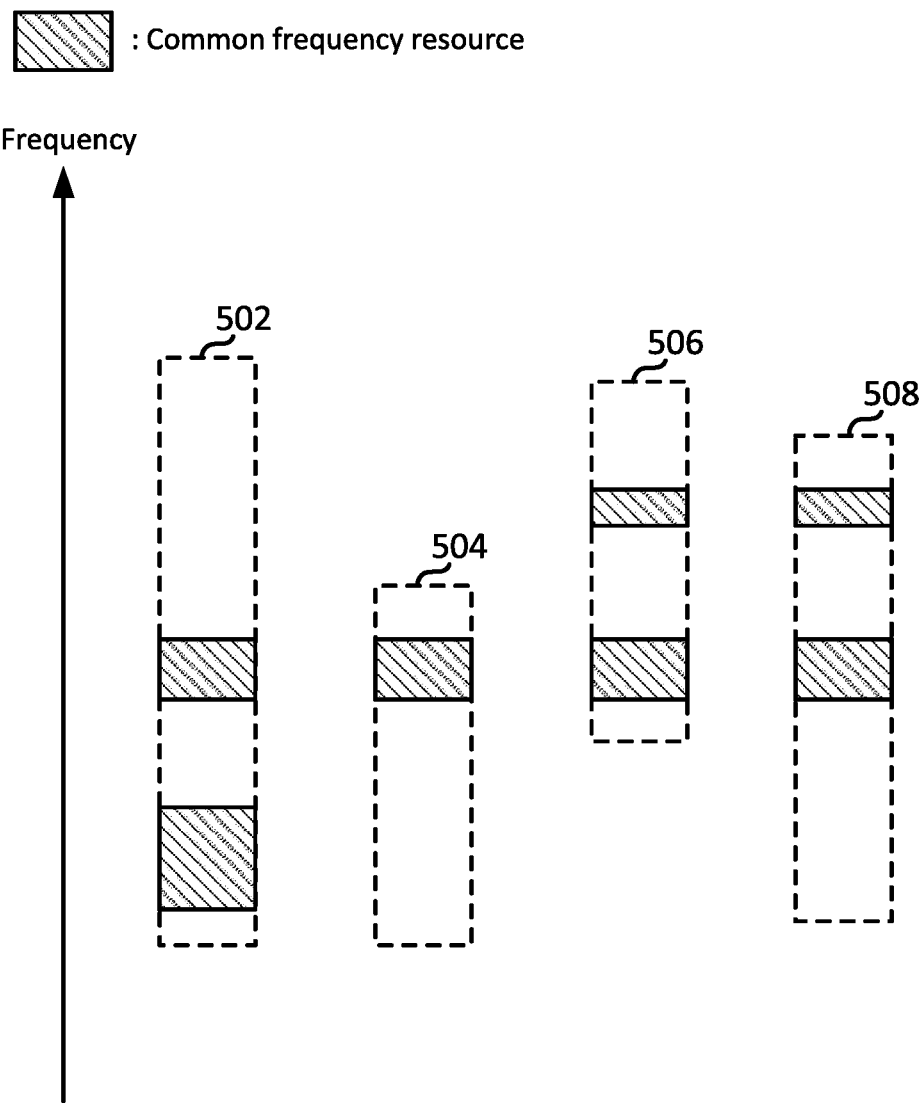
FIG. 5 is a schematic diagram illustrating that each Band Width Part (BWP) configured to a UE is associated with one or more common frequency resources used for the MBS reception, according to an implementation of the present disclosure.

FIG. 5 is a schematic diagram illustrating that each BWP configured to a UE is associated with one or more common frequency resources used for the MBS reception, according to an implementation of the present disclosure. For example, in FIG. 5, four DL BWPs (e.g., BWP #0 502, BWP #1 504, BWP #2 506, and BWP #3 508) are configured to a UE. The common frequency resource(s)(represented by boxes with diagonal lines in FIG. 5) included in each BWP may be configured in one or more IEs that configures a UE's DL BWP (e.g., BWP-DownlinkIE, BWP-DownlinkCommon IE, BWP-DownlinkDedicated IE, etc.).

Some information related to common frequency resources carried in each BWP (e.g., BWP #0 502, BWP #1 504, BWP #2 506, BWP #3 508) may be provided in an IE that configures a UE's DL BWP (e.g., BWP-Downlink 1E, BWP-DownlinkCommon IE, BWP-DownlinkDedicated JE, etc.). For example, the information may be the start of a PRB of a common frequency resource, the frequency duration of a common frequency resource, the number of common frequency resources carried in a BWP, the frequency offset between the start of a BWP and the start of a common frequency resource, and so on.

In some implementations, the mapping relationship between one MBS common frequency resource and one or multiple MBSs may be configured by the network. When the mapping is provided, the UE (that is interested in the one or multiple MBSs) may be expected to monitor, on the MBS common frequency (resource), the scheduling information that schedules the one or multiple MBSs and/or DL data corresponding to the one or more MBSs (e.g., MAC PDU(s) that includes one or more MBS data). In addition, each BWP configured to a UE may be associated with one mapping. For example, the network may configure/provide the mapping relationship between an MBS common frequency resource ID and MBS ID(s) (e.g., G-RNTI, TMGI, MBS session ID, LCID, bearer ID, QoS flow ID, etc.) to the UE via a mapping table (e.g., Table2).

TABLE 2

A mapping table that maps each MBS common frequency resource to one or more MBSs.

| MBS common frequency resource ID | MBS ID |
|---|---|
| 1 | G-RNTI for MBS1 |
| 2 | G-RNTI for MBS 2 and 3 |
|   | G-RNTI for MBS4 |

Moreover, the mapping table may be configured in a broadcast system information (e.g., SIB) or dedicated RRC signalling. Note that if a mapping table, which maps an MBS common frequency resource ID to one or multiple G-RNTIs, is provided, the UE may also need to have the knowledge about the mapping between a G-RNTI and one or more MBSs. Hence, the network may also provide the mapping between G-RNTI and one or more MBSs (e.g., the mapping between a G-RNTI and one or more TMGI/MBS session IDs to the UE). In addition, the network may configure one or more mapping tables to different BWPs configured to a UE.

In the example illustrated in Table2, MBS common frequency resource ID 1 may be used to receive scheduling information that schedules MBS1 and/or DL data corresponding to MBS1, and MBS common frequency resource ID 2 may be used to receive scheduling information that schedules MBSs 2, 3, and 4 and/or DL data corresponding to MBSs 2, 3 and 4. For example, the network may indicate one or more MBSs in the IE that configure an MBS common frequency resource. If one or more MBSs is indicated in the IE that configure an MBS common frequency resource, it may imply that the UE can receive scheduling information that schedules the one or more MBSs in the MBS common frequency resource and/or receive DL data corresponding to the one or more MBSs in the MBS common frequency resource.

In some implementations, the network may configure/provide the mapping among a BWP ID, an MBS common frequency resource ID and MBS ID(s) (e.g., G-RNTI, TMGI, MBS session ID, LCID, bearer ID, QoS flow ID, etc.) to the UE via a mapping table (e.g., Table3).

TABLE 3

A mapping table for BWP ID, MBS common frequency resource ID and MBS ID.

| BWP ID | MBS common frequency resource ID | MBS ID |
|---|---|---|
| 0 | 1 | G-RNTI for MBS1 |
| 1 | 2 | G-RNTI for MBS1 |
| 1 | 3 | G-RNTI for MBS 2 and 3 |
|   |   | G-RNTI for MBS4 |
| 2 | 4 | G-RNTI for MBS1 |
| 2 | 5 | G-RNTI for MBS4 |
| 3 | 6 | G-RNTI for MBS5 |
| 0 |   |   |

Moreover, the mapping table may be configured in a broadcast system information (e.g., SIB) or dedicated RRC signalling. Note that if a mapping table, which maps an MBS common frequency resource ID to one or multiple G-RNTIs, is provided, the UE may also need to have the knowledge about the mapping between a G-RNTI and one or more MBSs. Hence, the network may also provide the mapping between G-RNTI and one or more MBSs (e.g., the mapping between a G-RNTI and one or more TMGI/MBS session IDs to the UE). In addition, the network may configure one or more mapping tables to different BWPs configured to a UE.

In the example illustrated in Table3, MBS common frequency resource ID 1 may be used to receive scheduling information that schedules MBS1 and/or DL data corresponding to MBS1 on BWP #0 (e.g., BWP #0 502). Similarly, scheduling information that schedules MBS1 and/or DL data corresponding to MBS1 can also be received on common frequency resource #2 and #4 carried on BWP #1 (e.g., BWP #1 504) and BWP #2 (e.g., BWP #2 506), respectively. Scheduling information that schedules MBS1 and/or DL data corresponding to MBS4 can be received on common frequency resource #3 and #5 carried on BWP #1 (e.g., BWP #1 504) and BWP #2 (e.g., BWP #2 506), respectively. MBS common frequency resource ID 3 may be used to receive scheduling information that schedules MBS 2, 3, and 4 and/or DL data corresponding to MBS 2, 3 and 4 on BWP #1 (e.g., BWP #1 504). Finally, MBS common frequency resource ID 6 may be used to receive scheduling information that schedules MBS5 and/or DL data corresponding to MBS5 on BWP #0 (e.g., BWP #0 502) and BWP #3 (e.g., BWP #1 508).

Each BWP may broadcast/multicast the same MBS. And the same common frequency resource may be used to receive the same MBS on different BWPs. In addition, the G-RNTI for the same MBS on different frequency resources and/or BWPs may be the same or different. For example, the G-RNTI calculation may be related to BWP ID, common frequency ID, MBS sessions, and so on. The different numerologies and/or MCS may be applied to the same common frequency resource used to receive scheduling information that schedules MBS(s) and/or DL data corresponding to MBS(s) on different BWPs.

In some implementations, an indication may be used to indicate whether the MBS common frequency resource is specifically for receiving retransmission of one or more MBSs. If the indication is presented (with a specific value), the UE may consider the MBS common frequency resource specifically for receiving retransmission of one or more MBSs. For example, if an MBS common frequency resource is specifically for receiving retransmission of one or more MBSs, the UE may determine any scheduling information, which is received in the MBS common frequency resource, as a retransmission scheduling. In this example, the UE may always consider the NDI value to not have been toggled compared with the previous DL assignment of the same HARQ process, regardless of the NDI value in the scheduling information. For example, if an MBS common frequency resource is specifically for receiving retransmission of one or more MBSs, the UE may determine any MAC PDU, which is received in the MBS, as a retransmitted MAC PDU. In this example, the UE may combine the received MAC PDU with the MAC PDU in the soft buffer with the same HARQ process. The UE may also attempt to decode the combined data.

In some implementations, an indication may be used to indicate whether the MBS common frequency resource is specifically for receiving new transmission of one or more MBSs. If the indication is presented (with a specific value), the UE may consider the MBS common frequency resource specifically for receiving new transmission of one or more MBSs. For example, if an MBS common frequency resource is specifically for receiving new transmission of one or more MBSs, the UE may determine any scheduling information, which is received in the MBS common frequency resource, as a new transmission scheduling. In this example, the UE may always consider the NDI value to have been toggled compared with the previous DL assignment of the same HARQ process, regardless of the NDI value in the scheduling information. For example, if an MBS common frequency resource is specifically for receiving new transmission of one or more MBSs, the UE may determine any MAC PDU, which is received in the MBS, as a new transmission MAC PDU. In this example, the UE may override another MAC PDU, which is already stored in the soft buffer with the same HARQ process, with the new transmission MAC PDU.

In some implementations, the common frequency resource(s) configured to an RRC_CONNECTED UE for receiving MBS data may be reused when the RRC_CONNECTED UE moves to the RRC_INACTIVE/IDLE state. For example, a UE may be configured common frequency resource(s) for MBS reception in the RRC_CONNECTED state. When a UE moves to the RRC_INACTIVE/IDLE state, if the common frequency resource(s) configured in RRC_CONNECTED state is overlapped with the DL BWP configure to a UE or initial BWP, the UE may directly perform MBS reception on that common frequency resource (s).

Location 3: A Specific Cell

In some implementations, the specific cell may be an SpCell, SCell, and/or a cell with a specific cell ID. For example, the network may transmit scheduling information that schedules one or multiple MBSs on either a UE's SpCell, SCell, and/or a cell with a specific cell ID. For example, the network may transmit DL data for one or multiple MBSs (e.g., one or more MAC PDUs, each of which includes one or more MBS data) on either the UE's SpCell, SCell, and/or a cell with a specific cell ID. For example, the network may only configure an MBS common frequency resource in a cell with a specific cell ID.

In some implementations, the specific cell may be a cell explicitly configured by the network (or preconfigured by the UE). For example, the specific cell may be configured, by the network, via dedicated signalling (e.g., a RRCReconfguration message). For example, the network may indicate that a cell corresponds a specific cell via the presence of an indication (with a specific value). If the indication is presented (with a specific value), the UE may consider the cell as a specific cell. In contrast, if the indication is not presented (with a specific value), the UE may not consider the cell as a specific cell.

In some implementations, a mapping between a cell and one or multiple MBSs may be configured by the network. When the mapping is provided, the UE (that is interested in the one or multiple MBSs) may be expected to monitor, on the cell, the scheduling information that schedules the one or multiple MBSs and/or DL data corresponding to the one or more MBSs (e.g., MAC PDU(s) that includes one or more MBS data).

For example, the network may configure/provide the mapping between a cell ID and MBS IDs (e.g., G-RNTI, TMGI, MBS session ID, LCID, bearer ID, QoS flow ID, etc.) to the UE via a mapping table (e.g., Table4).

TABLE 4

A mapping table that maps each serving cell to one or more MBSs.

| Cell ID | MBS ID |
| --- | --- |
| 1 | G-RNTI for MBS1 |
| 2 | G-RNTI for MBS 2 and 3 |
|  | G-RNTI for MBS4 |

Moreover, the mapping table may be configured in a broadcast system information (e.g., SIB) or dedicated signalling (e.g., a RRC message or MAC CE). Note that if a mapping table, which maps a cell ID to one or multiple G-RNTIs, is provided, the UE may also need to have the knowledge about the mapping between a G-RNTI and one or more MBSs. Hence, the network may also provide the mapping between G-RNTI and one or more MBSs (e.g., the mapping between a G-RNTI and one or more TMGI/MBS session ID to the UE).

In the example illustrated in Table4, cell ID 1 may be used to receive scheduling information that schedules MBS1 and/or DL data corresponding to MBS1, and cell ID 2 may be used to receive scheduling information that schedules MBS 2, 3, and 4 and/or DL data corresponding to MBS 2, 3 and 4. For example, the network may indicate one or more MBSs in the IE that configures a serving cell (e.g., ServingCellConfg). If one or more MBSs is indicated in the IE that configures an MBS common frequency resource, it may imply that the UE can receive scheduling information that schedules the one or more MBSs in the serving cell and/or receive DL data corresponding to the one or more MBSs in the serving cell.

Location 4: A Specific CORESET/PDCCH/Search Space

In some implementations, the network may configure a specific CORESET/PDCCH/search space for reception of scheduling information that schedules one or multiple MBSs. For example, an indication may be included in the IE that defines how/where to search for PDCCH candidates (e.g., SearchSpace IE). Moreover, the presence of the indication (with a specific value) may be used to indicate the corresponding search space is for reception of scheduling information that schedules one or multiple MBSs. For example, an indication may be included in the IE that configure a time/frequency CORESET (e.g., ControlResourceSet IE). Moreover, the presence of the indication (with a specific value) may be used to indicate the corresponding search space is for reception of scheduling information that schedules one or multiple MBSs. For example, a first specific IE may be used to define how/where to search for PDCCH candidates for scheduling MBS (e.g., searchspace-MBS IE). On the other hand, the second specific IE may be used to configure a time/frequency CORESET for receiving scheduling information that schedules MBS (e.g., ControlResourceSet-MBS IE). Moreover, the first specific IE and/or the second specific IE may be included in the IE for configuring UE-specific PDCCH parameters (e.g., PDCCH-Config IE).

In some implementations, a mapping between a CORESET/PDCCH/search space configuration and one or multiple MBSs may be configured by the network. When the mapping is provided, the UE (that is interested in the one or multiple MBSs) may be expected to monitor, on the specific CORESET/PDCCH/search space configuration, the scheduling information that schedules the one or multiple MBSs. For example, the network may configure/provide the mapping between a CORESET/search space ID and MBS IDs (e.g., G-RNTI, TMGI, MBS session ID, LCID, bearer ID, QoS flow ID, etc.) to a UE via a mapping table (e.g., Table5).

TABLE 5

A mapping table that maps each CORESET/PDCCH/search space configuration to one or more MBSs.

| searchSpaceId/ ControlResourceSetId | MBS ID |
| --- | --- |
| 1 | G-RNTI for MBS1 |
| 2 | G-RNTI for MBS 2 and 3 |
|  | G-RNTI for MBS4 |

Moreover, the mapping table may be configured in a broadcast system information (e.g., SIB) or dedicated signalling (e.g., a RRC message or MAC CE). Note that if a mapping table, which maps a CORESET/search space ID to one or multiple G-RNTIs, is provided, the UE may also need to have the knowledge about the mapping between a G-RNTI and one or more MBSs. Hence, the network may also provide the mapping between G-RNTI and one or more MBSs (e.g., the mapping between a G-RNTI and one or more TMGI/MBS session IDs to the UE).

In the example illustrated in Table5, CORESET/search space ID 1 may be used to receive scheduling information that schedules MBS1 and/or DL data corresponding to MBS1, and CORESET/search space ID 2 may be used to receive scheduling information that schedules MBS 2, 3, and 4 and/or DL data corresponding to MBS 2, 3 and 4.

In some implementations, an indication may be used to indicate whether the CORESET/PDCCH/search space configuration is specifically for receiving retransmission of one or more MBSs. If the indication is presented (with a specific value), the UE may consider the CORESET/PDCCH/search space configuration specifically for receiving retransmission of one or more MBSs. For example, if a CORESET/PDCCH/search space configuration is specifically for receiving retransmission of one or more MBSs, the UE may determine any scheduling information, which is received from the CORESET/PDCCH/search space configuration, as a retransmission scheduling. In this example, the UE may always consider the NDI value to not have been toggled compared with the previous DL assignment of the same HARQ process, regardless of the NDI value in the scheduling information.

In some implementations, an indication may be used to indicate whether the CORESET/PDCCH/search space configuration is specifically for receiving a new transmission of one or more MBSs. If the indication is presented (with a specific value), the UE may consider the MBS common frequency resource specifically for receiving a new transmission of one or more MBSs. For example, if an CORESET/PDCCH/search space configuration is specifically for receiving a new transmission of one or more MBSs, the UE may determine any scheduling information, which is received from the CORESET/PDCCH/search space configuration, as a new transmission scheduling. In this example, the UE may always consider the NDI value to have been toggled compared with the previous DL assignment of the same HARQ process, regardless of the NDI value in the scheduling information.

In some implementations, the UE may monitor on a specific CORESET/PDCCH/search space for receiving PTP transmission of one or more MBSs. Here, the UE may monitor DL assignment(s) associated with C-RNTI for scheduling retransmission/new transmission of one or more MBSs on the specific CORESET/PDCCH/search space for receiving PTP transmission. The specific CORESET/PDCCH/search space for receiving PTP transmission of one or more MBSs may be explicitly configured by the network.

In some implementations, the UE may monitor on a specific CORESET/PDCCH/search space for receiving PTM transmission of one or more MBSs. Here, the UE may monitor DL assignments associated with G-RNTI for scheduling retransmission/new transmission of one or more MBSs on the specific CORESET/PDCCH/search space for receiving PTM transmission. The specific CORESET/PDCCH/search space for receiving PTM transmission of one or more MBSs may be explicitly configured by the network.

UE behaviors upon (or after) missing scheduling information and/or DL data for one or multiple MBSs.

In some implementations, the UE may perform certain action(s) when a certain condition is met. For example, the condition may include that the UE does not successfully receive/decode certain scheduling information (e.g., a DL assignment) that schedules one or multiple MBSs. For example, the condition may include that a UE does not successfully receive/decode DL data (e.g., a MAC PDU) of one or multiple MBSs.

In some implementations, one or multiple MBSs and/or the scheduling information that schedules the one or multiple MBSs may be received, by the UE, from at least one of the locations as defined above (e.g., location 1 to location 4). Moreover, the scheduled one or multiple MBSs may be a new transmission or a retransmission.

In some implementations, the UE may consider itself as failing to successfully receive the scheduling information if the UE does not receive the scheduling information from at least one of the locations defined above (e.g., location 1 to location 4).

In some implementations, the UE may consider itself as failing to not successfully receive the (data of) one or multiple MBSs if the UE does not successfully decode the DL data (e.g., a MAC PDU) that correspond to the (data of) one or multiple MBSs.

The action(s) to be performed by the UE when the condition is met may be at least one of operations 1 to 9 described as follows. In some implementations, the UE may perform the action(s) (e.g., at least one of operations 1 to 9) after sending a UL feedback (e.g., a HARQ NACK) to the network. The UL feedback may notify the network that the UE does not successfully receive the one or multiple MBSs.

Operation 1: (Re)Start a Retransmission Timer (or Timer-Retransmission)

In some implementations, the retransmission timer may be configured to a UE via dedicated signaling (e.g., a RRC message) and/or broadcast system information. Further, the retransmission timer may be configured per (DL) HARQ process, per BWP, per MBS common frequency resource (set), per cell, per MBS, per MAC entity, per PTP leg, per PTM leg, per (DL) HARQ process for a (unicast/multicast) DRX configuration, etc. If the retransmission timer is configured per MBS (i.e., configured on a per-MBS basis) and each MBS is mapped to a G-RNTI, this also means that the retransmission timer is configured per G-RNTI. In the present disclosure, a DRX configuration that does not map to any MBS may be referred to as a unicast DRX configuration or a non-MBS DRX configuration.

In some implementations, while the retransmission timer (of a HARQ process/MBS/BWP/cell) is running, the UE may monitor at least one of the locations described above (e.g., location 1 on location 4) for receiving the scheduling information, where the scheduling information may schedule/indicate a DL resource for retransmission of a MAC PDU. The MAC PDU may correspond to the HARQ process/MBS/BWP/cell of the retransmission timer. Moreover, the MAC PDU may be a MAC PDU that was not successfully received/decoded by the UE.

As described above, the retransmission timer may be configured per HARQ process. In this case, the UE may (re)start the retransmission timer for a HARQ process if it does not successfully receive/decode DL data corresponding to the HARQ process. While the retransmission timer for the HARQ process is running, a UE may monitor, e.g., at least one of location 1 to location 4, for receiving the scheduling information that schedules the DL resource (e.g., PDSCH) for a retransmission of the DL data. The scheduling information may correspond to the HARQ process of the retransmission timer. Further, the HARQ process ID may be included in the DCI field of the scheduling information. The HARQ process indicated in the DCI field of the scheduling information may be the same as the HARQ process of the retransmission timer. Further, the scheduling information may schedule a DL resource for retransmitting a MAC PDU that includes one or multiple MBSs. For example, the NDI for the HARQ process of the scheduling information may not be toggled compared to the value in the previous received MAC PDU of this HARQ process. The UE may always determine the NDI of the received scheduling information as not toggled when compared with the NDI of the previous scheduling information with the same HARQ process, regardless of the value of the NDI.

In some implementations, the retransmission timer may be configured per MBS. In this case, the UE may (re)start the retransmission timer for an MBS if the UE does not successfully receive/decode the DL data corresponding to the MBS. While the retransmission timer for the MBS is running, the UE may monitor at least one of location 1 to location 4 described above for receiving the scheduling information that schedules a DL resource (e.g., PDSCH) for retransmission of DL data, where the scheduling information may correspond to the MBS of the retransmission timer. The scheduling information may be associated with a G-RNTI that corresponds to the MBS of the retransmission timer.

Further, the scheduling information may schedule a DL resource for retransmitting a MAC PDU that includes the corresponding MBS. For example, the NDI for the HARQ process of the scheduling information may not be toggled compared to the value in the previous received MAC PDU of this HARQ process. The UE may always determine the NDI of the received scheduling information as not toggled when compared with the NDI of the previous scheduling information with the same HARQ process, regardless of the value of the NDI.

In some implementations, while the retransmission timer is running, the UE may monitor from at least one of the locations as defined above (e.g., location 1 to location 4) for receiving a DL resource. Moreover, a MAC PDU may be retransmitted on the DL resource. Here, the MAC PDU may be referred to as the MAC PDU that was not successfully received/decoded by the UE.

For example, the retransmission timer may be configured per HARQ process. A UE may (re)start the retransmission timer for a HARQ process if it does not successfully receive/decode DL data corresponding to the HARQ process. While the retransmission timer for the HARQ process is running, a UE may monitor, from at least one of the locations as defined above (e.g., location 1 to location 4), for a retransmitted DL resource. The DL resource may correspond to the HARQ process of the retransmission timer. The DL resource may be used for retransmitting a MAC PDU that includes one or multiple MBSs. The DL resource may correspond to a group common PDSCH configuration. The DL resource may correspond to an SPS group common PDSCH configuration. Further, the UE may always combine the received MAC PDU with the MAC PDU in the soft buffer with the same HARQ process. The UE may also attempt to decode the combined data.

For example, the retransmission timer may be configured per MBS. A UE may (re)start the retransmission timer for an MBS if it does not successfully receive/decode DL data corresponding to the MBS. While the retransmission timer for an MBS is running, the UE may monitor, from at least one of the locations as defined above, for a retransmitted DL resource. The DL resource may correspond to the MBS of the retransmission timer. The DL resource may be used for retransmitting a MAC PDU that corresponds to the MBS. The DL resource may correspond to a group common PDSCH configuration. The DL resource may correspond to an SPS group common PDSCH configuration. The UE may always combine the received MAC PDU with the MAC PDU in the soft buffer with the same HARQ process. The UE may also attempt to decode the combined data.

In some implementations, while the retransmission timer is running, the UE may monitor the PDCCH/search space/CORESET associated with another PTM/PTP leg.

For example, if the UE does not successfully receive/decode a first scheduling information and/or DL data (e.g., MAC PDU) associated with a PTM leg, the UE may (re)start the retransmission timer. Moreover, the UE may monitor a second scheduling information associated with a PTP leg while the retransmission timer is running. The PTM leg and the PTP leg may be associated with a common PDCP entity. The retransmission timer may be configured per PTP/PTM leg. The first scheduling information may be scheduled on a PDCCH/search space/CORESET. The first scheduling information may be associated with G-RNTI and/or C-RNTI. Moreover, the PDCCH/search space/CORESET may be configured specifically for transmitting scheduling information that schedules MBS data (for initial transmission). On the other hand, the second scheduling information may be scheduled on a PDCCH/search space/CORESET. The second scheduling information may be associated with C-RNTI. Moreover, the PDCCH/search space/CORESET may be configured specifically for transmitting scheduling information that schedules MBS data (for retransmission). In addition, the DL data described in the present disclosure may be, or may include, MBS data.

If the UE does not receive/decode a first scheduling information and/or DL data (e.g., MAC PDU) associated with a PTP leg, the UE may (re)start the retransmission timer. Moreover, the UE may monitor a second scheduling information associated with a PTM leg while the retransmission timer is running. The PTM leg and the PTP leg may be associated with a common PDCP entity. The retransmission timer may be configured per PTP/PTM leg. The first scheduling information may be scheduled on a PDCCH/search space/CORESET, where the first scheduling information may be associated with C-RNTI. Moreover, the PDCCH/search space/CORESET may be configured specifically for transmitting scheduling information that schedules MBS data (for initial transmission). The second scheduling information may be scheduled on a PDCCH/search space/CORESET, where the second scheduling information may be associated with C-RNTI and/or G-RNTI. Moreover, the PDCCH/search space/CORESET may be configured specifically for transmitting scheduling information that schedules MBS data (for retransmission).

In some implementations, while the retransmission timer is running, the UE may monitor a dynamic switching indication from the network.

For example, the dynamic switching indication may PHY-based, e.g., via DCI signaling. Moreover, the dynamic switching indication may be indicated by a specific flag in a DCI field (with a specific DCI format). The specific flag may be A bits long (e.g., 1 bit) when the retransmission timer is running and may be B bits long (e.g., 0 bit) when the retransmission timer is not running, where A and B are positive integers. Moreover, if a specific value (e.g., 1) is indicated by the specific flag, the UE may determine that the corresponding DCI is for indicating a dynamic switching indication.

If the UE does not successfully receive scheduling information and/or DL data (e.g., MAC PDU) associated with a PTM/PTP leg, the UE may (re)start the retransmission timer. Moreover, the UE may monitor a dynamic switching indication while the retransmission timer is running. In this case, the retransmission timer may be configured per PTM/PTP. The scheduling information may be scheduled on a PDCCH/search space/CORESET. Moreover, the PDCCH/search space/CORESET may be configured specifically for transmitting scheduling information that schedules MBS data. Further, the scheduling information may be associated with a G-RNTI and/or C-RNTI.

In some implementations, while the retransmission timer is running, the UE may be in the DRX Active Time.

For example, the retransmission timer may be configured per HARQ process. While the retransmission timer for an MBS is running, the UE may be in (e.g., remain/stay/operate in) the DRX Active Time for the corresponding HARQ process. During the DRX Active Time for the corresponding HARQ process, the UE may monitor on a PDCCH for possible scheduling information that schedules the corresponding HARQ process.

For example, the retransmission timer may be configured per MBS. While the retransmission timer for an MBS is running, the UE may be in (e.g., remain/stay/operate in) the DRX Active Time for the corresponding MBS. During the DRX Active Time for the corresponding MBS, the UE may monitor on a PDCCH for possible scheduling information that schedules the corresponding MBS. Here, the scheduling information may be associated with the G-RNTI of the corresponding MBS.

In some implementations, the retransmission timer (of a HARQ process/MBS/BWP/cell/MBS common frequency resource) may be stopped when at least one of the following conditions (a) to (g) is satisfied:

(a) The UE successfully receives/decodes a MAC PDU (of the HARQ process/MBS/BWP/cell/MBS common frequency resource). For example, the retransmission timer of a HARQ process/MBS may be stopped when a UE receives a MAC PDU of the HARQ process/MBS. For example, the retransmission timer of a BWP/cell/MBS common frequency resource may be stopped when a UE receives a MAC PDU on the BWP/cell/MBS common frequency resource.

(b) The UE receives scheduling information that indicates a MAC PDU (of the HARQ process/MBS/BWP/cell/MBS common frequency resource). For example, the retransmission timer of a HARQ process/MBS may be stopped when a UE receives scheduling information that indicates a MAC PDU of the HARQ process/MBS. For example, the retransmission timer of a HARQ process/MBS may be stopped when the UE receives scheduling information for the HARQ process/MBS, and the NDI for the scheduling information of the scheduling has been toggled. For example, the retransmission timer of a BWP/cell/MBS common frequency resource may be stopped when a UE receives scheduling information that indicates a MAC PDU on the BWP/cell/MBS common frequency resource.

(c) The UE successfully decodes a MAC PDU (of the HARQ process/MBS/BWP/cell/MBS common frequency resource). For example, the retransmission timer of a HARQ process/MBS may be stopped when a UE successfully decodes a MAC PDU of the HARQ process/MBS. For example, the retransmission timer of a BWP/cell/MBS common frequency resource may be stopped when a UE successfully decodes a MAC PDU of the BWP/cell/MBS common frequency resource.

(d) The UE receives a reconfiguration message which reconfigure the retransmission timer.

(e) The UE is indicated to switch the active BWP to another BWP which does not contain the CFR.

(f) The UE is not interested in receiving data of the MBS(s) (e.g., when transmitting the new MBS interest indication message and the interested MBS(s) are changed or not in the list anymore).

(g) The UE performs cell (re)selection, re-establishment, switches from the current BWP to a new BWP (e.g., reception of a BWP switching indication), etc.

In some implementations, when the retransmission timer (of a HARQ process/MBS/BWP/cell/MBS common frequency resource) expires, the UE may perform at least one of the following actions (a) to (d):

(a) The UE may send a specific message to the network (as described in operation 6).

(b) The UE may perform state transition (as described in operation 7).

(c) The UE may initiate a specific type of RA procedure (as described in operation 8).

(d) The UE may release/deactivate/suspend/clear a specific configuration (as described in operation 9).

In some implementations, the retransmission timer described in the present disclosure may be equivalent to one of drx-RetransmissionTimerDL-PTM, drx-RetransmissionTimerDL, drx-InactivityTimer, drx-InactivityTimerSCPTM. drx-HARQ-RTT-TimerDL, and drx-HARQ-RTT-TimerDL-PTM. Further, in some implementations, the retransmission timer may be (re)started at a period after unsuccessful reception of data. In some implementations, the period may be configured by the network. In one example, the period may be defined by the drx-HARQ-RTT-TimerDL or drx-HARQ-RTT-TimerDL-PTM configured at the UE. In the present disclosure, drx-HARQ-RTT-TimerDL may be configured per HARQ process for the UE's unicast DRX configuration. Moreover, drx-HARQ-RTT-TimerDL-PTM may be configured per HARQ process for the UE's MBS DRX configuration.

In one example, after a UE determines/identifies an unsuccessful reception of a first DL resource (e.g., a PDSCH) scheduled by (DCI indicating a) first DL assignment with a HARQ process ID, the first DL resource being used for transmitting data (e.g., a MAC PDU) of a MBS, the UE may (re)start a retransmission timer for controlling the PDCCH monitoring activity of the UE's G-RNTI. Here, the retransmission timer may correspond to the MBS and the HARQ process ID of the DL resource, e.g., a retransmission timer that corresponds to the MBS (DRX configuration) and the HARQ process ID of the first DL resource (e.g., drx-RetransmisisonTimerDL-PTM). Subsequently, while the retransmission timer (e.g., the drx-RetransmissionTimerDL-PTM) is running, the UE may monitor/decode a PDCCH for (DCI indicating) a second DL assignment. The (DCI indicating the) second DL assignment may schedule/indicate a second DL resource for retransmission of the first DL resource (e.g., the MAC PDU that was unsuccessfully received by the UE on the first DL resource). Moreover, the second DL assignment (e.g., the DCI) may be associated with the UE's C-RNTI and/or the UE's G-RNTI. In other words, while the retransmission timer is running, the UE may monitor/decode the PDCCH for the second DL assignment that associates with the UE's C-RNTI and/or G-RNTI. Here, the UE's G-RNTI may be mapped to the MBS of the first/second DL resource. Moreover, the first DL assignment and the second DL assignment may correspond to the same HARQ process. In the present example, the retransmission timer may be (re)started at a period after the UE determines the unsuccessful reception of the first DL resource. The period may be defined by a second timer different from the retransmission timer. Moreover, the second timer may correspond to the MBS (DRX configuration) and the HARQ process ID of the first DL resource. Here, the retransmission timer may be (re)started upon expiration of the second timer.

In one example, after a UE determines an unsuccessful reception of a first DL resource (e.g., a PDSCH) scheduled by (DCI indicating a) first DL assignment with a HARQ process ID, the first DL resource being used for transmitting data (e.g., a MAC PDU) of a MBS, the UE may (re)start a retransmission timer for controlling the PDCCH monitoring activity of the UE's C-RNTI (in addition to (re)starting another retransmission timer from a DRX configuration, which is mapped to the MBS, and is for controlling the PDCCH monitoring activity of the UE's G-RNTI of the MBS). Here, the retransmission timer may correspond to the HARQ process ID of the DL resource, e.g., a retransmission timer that corresponds to unicast DRX configuration (e.g., a non-MBS DRX configuration or a DRX configuration that does not map to any MBS) and the HARQ process ID of the first DL resource (e.g., a drx-RetransmisisonTimerDL). Subsequently, while the retransmission timer (e.g., the drx-RetransmissionTimerDL) is running, the UE may monitor/decode a PDCCH for (DCI indicating) a second DL assignment. The (DCI indicating the) second DL assignment may schedule/indicate a second DL resource for retransmission of the first DL resource (e.g., the MAC PDU that was unsuccessfully received by the UE on the first DL resource). Moreover, the second DL assignment (e.g., the DCI) may be associated with the UE's C-RNTI. In another word, while the retransmission timer is running, the UE may monitor/decode a PDCCH for the second DL assignment that associates with the UE's C-RNTI. Here, the first DL assignment and the second DL assignment may correspond to the same HARQ process. In the present example, the retransmission timer may be (re)started at a period after the UE determines the unsuccessful reception of the first DL resource. The period may be defined by a second timer different from the retransmission timer. Moreover, the second timer may correspond to a unicast DRX configuration (e.g., a non-MBS DRX configuration or a DRX configuration that does not map to any MBS) and may correspond to the HARQ process ID of the first DL resource. Here, the retransmission timer may be (re)started upon expiration of the second timer. Given this, the UE has the chance to receive the retransmitted (or new) data of the MBS under the PTP and PTM transmission schemes, thereby improving the reliability of MBS data reception.

In some implementations, the time unit of the retransmission timer may be configured as millisecond, second, symbol, slot, subframe, or periodic of MBS specific CORESET/search space.

Operation 2: Stop a New Transmission Timer (or Timer-New-Transmission).

In some implementations, the new transmission timer may be configured to a UE via dedicated signaling (e.g., an RRC message) and/or broadcast system information. The new transmission timer may be configured per HARQ process, per BWP, per MBS common frequency resource (set), per cell, per MBS, per MAC entity, per PTP leg, per PTM leg, etc.

In some implementations, while the new transmission timer (of a HARQ process/MBS/BWP/cell) is running, the UE may monitor from at least one of the locations as described above (e.g., location 1 to location 4) for receiving the scheduling information from the network. Moreover, the scheduling information may schedule a DL resource for a new transmission (e.g., an initial transmission) of a MAC PDU from the network. Here, the MAC PDU may correspond to the HARQ process/MBS/BWP/cell of the new transmission timer. Moreover, the MAC PDU includes MBS data.

For example, the new transmission timer may be configured per HARQ process. While the new transmission timer for a HARQ process is running, a UE may monitor, from at least one of the locations as defined above (e.g., location 1 to location 4), for receiving scheduling information, where the scheduling information may schedule a DL resource (e.g., PDSCH) for an initial transmission of the DL data from the network. The HARQ process may be included in the DCI field of the scheduling information. The HARQ process indicated in the DCI field of the scheduling information may be the same as the HARQ process of the retransmission timer. The scheduling information may schedule a DL resource for initial transmission of a MAC PDU that includes one or multiple MBSs. For example, the NDI for the HARQ process of the scheduling information may be toggled compared to the value in the previously received MAC PDU of this HARQ process. Further, the UE may always determine the received scheduling information as toggled when compared with the previous scheduling information with the same HARQ process, regardless of the value of the NDI.

For example, the new transmission timer may be configured per MBS. While the new transmission timer for an MBS is running, a UE may monitor, from at least one of the locations as defined above (e.g., location 1 to location 4), for scheduling information, and the scheduling information may schedule a DL resource (e.g., PDSCH) for initial transmission of DL data. The scheduling may be associated with a G-RNTI, and the G-RNTI may correspond to the MBS of the new transmission timer. The scheduling information may schedule a DL resource for initial transmission of a MAC PDU that includes the corresponding MBS. For example, the NDI for the HARQ process of the scheduling information may be toggled compared to the value in the previously received MAC PDU of this HARQ process. Further, the UE may always determine the received scheduling information as toggled when compared with the previous scheduling information with the same HARQ process, regardless of the value of the NDI.

In some implementations, while the new transmission timer (of a HARQ process/MBS/BWP/cell) is running, the UE may monitor from at least one of the locations as defined above (e.g., location 1 to location 4) for a DL resource. Moreover, a MAC PDU for an initial transmission may be transmitted on the DL resource. Here, the MAC PDU may correspond to the HARQ process/MBS/BWP/cell of the new transmission timer.

For example, the new transmission timer may be configured per HARQ process. While the new transmission timer for a HARQ process is running, a UE may monitor, from at least one of the locations as defined above (e.g., location 1 to location 4), for a DL resource for a new transmission. The DL resource may be used for a new transmission of a MAC PDU that includes one or multiple MBSs. The DL resource may correspond to the HARQ process of the new transmission timer. The DL resource may correspond to an SPS group common PDSCH configuration.

For example, the new transmission timer may be configured per MBS. While the new transmission timer for an MBS is running, the UE may monitor, from at least one of the locations as defined above (e.g., location 1 to location 4), for a DL resource for a new transmission. The DL resource may be used for initial transmission of a MAC PDU that corresponds to the MBS. The DL resource may correspond to the MBS of the new transmission timer. The DL resource may correspond to an SPS group common PDSCH configuration.

In some implementations, while the new transmission timer (of a HARQ process/MBS/BWP/cell) is running, the UE may monitor the PDCCH/search space/CORESET associated with another PTM/PTP leg. For example, the same monitoring behaviour defined while the retransmission timer is running may be reused.

In some implementations, while the new transmission timer (of a HARQ process/MBS/BWP/cell) is running, the UE may monitor a dynamic switching indication. For example, the same monitoring behaviour defined while the retransmission timer is running may be reused.

In some implementations, while the new transmission timer (of a HARQ process/MBS/BWP/cell) is running, the UE may be in the DRX Active Time.

For example, the new transmission timer may be configured per HARQ process. While the new transmission timer for an MBS is running, a UE may be in the DRX Active Time for the corresponding HARQ process. During the DRX Active Time for the corresponding HARQ process, the UE may monitor on a PDCCH for possible scheduling information that schedules the corresponding HARQ process.

The new transmission timer may be configured per MBS. While the new transmission timer for an MBS is running, the UE may be in the DRX Active Time for the corresponding MBS. During the DRX Active Time for the corresponding MBS, the UE may monitor on a PDCCH for possible scheduling information that schedules the corresponding MBS. Here, the scheduling information may be associated with the G-RNTI of the corresponding MBS.

In some implementations, the new transmission timer (of a HARQ process/MBS/BWP/cell/MBS common frequency resource) may be (re)started when at least one of the following conditions (a) to (c) is satisfied:

(a) The UE receives a MAC PDU (of the HARQ process/MBS/BWP/cell/MBS common frequency resource). For example, the new transmission timer of a HARQ process/MBS may be (re)started when a UE receives a MAC PDU of the HARQ process/MBS. For example, the new transmission timer of a BWP/cell/MBS common frequency resource may be (re)started when a UE receives a MAC PDU on the BWP/cell/MBS common frequency resource.

(b) The UE receives scheduling information that indicates a MAC PDU. For example, the new transmission timer of a HARQ process/MBS may be (re)started when a UE receives scheduling information that indicates a MAC PDU of the HARQ process/MBS. For example, the new transmission timer of a BWP/cell/MBS common frequency resource may be (re)started when a UE receives scheduling information that indicates a MAC PDU on the BWP/cell/MBS common frequency resource.

(c) The UE successfully decodes a MAC PDU. For example, the new transmission timer of a HARQ process/MBS may be (re)started when a UE successfully decodes a MAC PDU of the HARQ process/MBS. For example, the new transmission timer of a BWP/cell/MBS common frequency resource may be (re)started when a UE successfully decodes a MAC PDU of the BWP/cell/MBS common frequency resource.

In some implementations, when the new transmission timer (of a HARQ process/MBS/BWP/cell/MBS common frequency resource) is not running (e.g., the new transmission timer expires or stops), the UE may perform at least one of the following actions (a) to (e):

(a) The UE may (re)start a specific timer (of the HARQ process/MBS/BWP/cell/MBS common frequency resource). The specific timer may be a retransmission timer. For example, once the new transmission timer (of a HARQ process/MBS/BWP/cell/MBS common frequency resource) is not running (i.e., expires or stops), a UE may (re)start a specific timer (of the HARQ process/MBS/BWP/cell/MBS common frequency resource). While the specific timer is running, the UE may monitor for scheduling of a DL resource for retransmission (of the HARQ process/MBS/BWP/cell/MBS common frequency resource). For example, once the new transmission timer (of a HARQ process/MBS/BWP/cell/MBS common frequency resource) is not running (i.e., expired or stopped), a UE may (re)start a specific timer (of the HARQ process/MBS/BWP/cell/MBS common frequency resource). While the specific timer is running, the UE may monitor a DL resource (for the HARQ process/MBS/BWP/cell/MBS common frequency resource). Moreover, the DL resource may be used for retransmitting a MAC PDU (for the HARQ process/MBS/BWP/cell/MBS common frequency resource).

(b) The UE may send a specific message to the network (as described in operation 6).

(c) The UE may perform state transition (as described in operation 7).

(d) The UE may initiate a RA procedure (as described in operation 8).

(e) The UE may release/deactivate/suspend/clear a specific configuration (as described in operation 9).

In some implementations, the new transmission timer may be equivalent to one of a DL DRX HARQ RTT timer (drx-HARQ-RTT-TimerDL), a DRX Inactivity timer (drx-InactviyTimer), and an SC-PTM DRX Inactivity timer (drx-InactivityTimerSCPTM).

In some implementations, the time unit of the new transmission timer may be configured as millisecond, second, symbol, slot, or subframe.

Operation 3: Increment a Specific Counter.

The specific counter may be maintained per MBS/BWP/cell/MBS common frequency resource. Moreover, the specific counter may be maintained in the MAC layer. Further, a specific threshold may be configured to a UE via dedicated signalling (e.g., a RRC message) and/or broadcast system information. The specific threshold may be configured per HARQ process, per BWP, per MBS common frequency resource (set), per cell, per MBS, per MAC entity, per PTP leg, per PTM leg, etc.

In some implementations, when the specific counter (of a HARQ process/MBS/BWP/cell/MBS common frequency resource/SPS group common PDSCH configuration) reaches the specific threshold (of the HARQ process/MBS/BWP/cell/MBS common frequency resource/SPS group common PDSCH configuration), the UE may send a specific message to the network.

For example, a specific counter may be maintained at a UE per MBS. Moreover, a UE may be configured, by the network, a specific threshold for an MBS. The specific counter for the MBS may be incremented (by 1) each time the UE unsuccessfully receives a DL scheduling information that corresponds to the MBS and/or each time the UE successfully receives/decodes a DL resource that corresponds to the MBS. When the specific counter reaches the specific threshold for the MBS, the UE may send a specific message to the network.

For example, a specific counter may be maintained at a UE per BWP/cell/MBS common frequency resource. Moreover, a UE may be configured, by the network, a specific threshold for a BWP/cell/MBS common frequency resource. The specific counter for the MBS may be incremented (by 1) each time the UE unsuccessfully receives a DL scheduling information on the BWP/cell/MBS common frequency resource and/or each time the UE successfully receives/decodes a DL resource on the BWP/cell/MBS common frequency resource. When the specific counter reaches the specific threshold for the MBS, the UE may send a specific message to the network.

In some implementations, when the specific counter (of a HARQ process/MBS/BWP/cell/MBS common frequency resource/SPS group common PDSCH configuration) reaches the specific threshold (of the HARQ process/MBS/BWP/cell/MBS common frequency resource/SPS group common PDSCH configuration), the UE may perform state transition.

For example, a specific counter may be maintained at a UE per MBS. Moreover, a UE in RRC_IDLE/RRC_INACTIVE may be configured, by the network, a specific threshold for an MBS. The specific counter for the MBS may be incremented (by 1) each time the UE unsuccessfully receives a DL scheduling information that corresponds to the MBS and/or each time the UE successfully receives/decodes a DL resource that corresponds to the MBS. When the specific counter reaches the specific threshold for the MBS, the UE may initiate an RRC Connection Establishment/RRC Resume procedure. Specifically, the UE may send an RRC setup request (RRCSetupRequest) message to the network as part of the RRC Connection Establishment procedure. Moreover, the establishment cause in the RRCSetupRequest message may be used to inform the network that a UE is interested in receiving an MBS (e.g., the corresponding MBS). Further, the UE may send an RRC Resume Request (RRCResumeRequest) message to the network as part of the RRC Resume procedure. Moreover, the resume cause in the RRCResumeRequest message may inform the network that a UE is interested in receiving an MBS (e.g., the corresponding MBS).

In some implementations, when the specific counter (of a HARQ process/MBS/BWP/cell/MBS common frequency resource/SPS group common PDSCH configuration) reaches the specific threshold (of the HARQ process/MBS/BWP/cell/MBS common frequency resource/SPS group common PDSCH configuration), the UE may initiate a specific type of RA procedure.

For example, a specific counter may be maintained at a UE per MBS. Moreover, a UE may be configured, by the network, a specific threshold for an MBS. The specific counter for the MBS may be incremented (by 1) each time the UE unsuccessfully receives a DL scheduling information that corresponds to the MBS and/or each time the UE successfully receives/decodes a DL resource that corresponds to the MBS. When the specific counter reaches the specific threshold for the MBS, the UE may initiate a specific type of RA procedure. Specifically, a specific RA preamble may be transmitted by the UE as part of the RA procedure. The specific RA preamble may be used to inform the network that the UE is interested in receiving an MBS (e.g., the corresponding MBS). Further, a specific MAC CE may be transmitted by the UE in MSG3/MSGA as part of the RA procedure. The specific MAC CE may be used to inform the network that the UE is interested in receiving an MBS (e.g., the corresponding MBS). After the UE informs the network that it is interested in receiving an MBS (e.g., the corresponding MBS), the UE may expect to receive the PDCCH with CRC bits scrambled by RA-RNTI or G-RNTI in the common search space configured for receiving the DCI of RAR to acquiring the scheduling information of MBS. The scheduling information of MBS may be included in the RAR, where the scheduling information included in the RAR may be common frequency resource, MCS, period, and so on.

In some implementations, when the specific counter (of a HARQ process/MBS/BWP/cell/MBS common frequency resource/SPS group common PDSCH configuration) reaches the specific threshold (of the HARQ process/MBS/BWP/cell/MBS common frequency resource/SPS group common PDSCH configuration), the UE may release/deactivate/suspend/clear a specific configuration.

For example, a specific counter may be maintained per SPS group common PDSCH configuration. Here, the SPS group common PDSCH configuration may be used for transmitting a specific MBS. Moreover, the UE may be configured, by the network, a specific threshold for an SPS group common PDSCH configuration. The specific counter for the MBS may be incremented (by 1) each time the UE successfully receives/decodes a DL resource that corresponds to the SPS group common PDSCH configuration. When the specific counter reaches the specific threshold for the MBS, the UE may release/deactivate/suspend/clear the specific SPS group common PDSCH configuration.

Operation 4: Start Monitoring at a Specific Location for Retransmission.

In operation 4, the UE may start monitoring from at least one of the locations as defined above (e.g., location 1 to location 4) for receiving the scheduling information that schedules a DL resource for a retransmission of a MAC PDU.

For example, if a UE does not successfully receive/decode first scheduling information and/or DL data (e.g., MAC PDU) of a HARQ process for a new transmission for a (consecutive) number of times, the UE may monitor, from at least one of the locations as defined above (e.g., location 1 to location 4), for receiving second scheduling information that schedules a DL resource for a retransmission. The second scheduling information may correspond to (or mapped to) the HARQ process of the first scheduling information. The first scheduling information may be used to schedule a DL resource for MBS transmission, where the DL data may include MBS data. Moreover, the DL data may be transmitted on a DL resource that corresponds to an SPS group common PDSCH configuration.

A HARQ process may be included in the DCI field of the first/second scheduling information. Here, the HARQ process of the second scheduling information may be the same as the HARQ process of the first scheduling information.

The second scheduling information may schedule a DL resource for retransmitting a MAC PDU that includes one or multiple MBSs. For example, the NDI for the HARQ process of the second scheduling information may not be toggled compared to the value in the previous received MAC PDU of this HARQ process.

DL data may be transmitted on a DL resource scheduled by the first scheduling information. In some implementations, the first scheduling information may be for PTM transmission scheme 1, and the second scheduling information may be for PTM transmission scheme 2. In some implementations, the first scheduling information may be for PTM transmission scheme 2, and the second scheduling information may be for PTP. Further, the UE may always determine the received second scheduling information as toggled when compared with the previous scheduling information with the same HARQ process, regardless of the value of the NDI.

If the UE does not successfully receive/decode the first scheduling information and/or DL data (e.g., MAC PDU) of an MBS for new transmission (for a (consecutive) number of times), the UE may monitor, from at least one of the locations as defined above (e.g., location 1 to location 4), for the second scheduling information that schedules a DL resource for a retransmission. In this case, the first scheduling information may be used to schedule a DL resource for MBS data transmission, where the DL data transmitted on the DL resource may include the MBS data. Moreover, the DL resource may correspond to an SPS group common PDSCH configuration. The second scheduling information may schedule a DL resource for retransmitting the MBS (data). The first scheduling information may be associated with the UE's G-RNTI for PTM transmission, and the second scheduling information may be associated with the UE's C-RNTI for PTP transmission.

The second scheduling information may be associated with a G-RNTI that corresponds to the MBS or may be associated with a C-RNTI. The second scheduling information may schedule a DL resource for retransmitting a MAC PDU that includes one or multiple MBSs. For example, the NDI for the HARQ process of the second scheduling information may not be toggled compared to the value in the previous received MAC PDU of this HARQ process.

DL data may be transmitted on a DL resource scheduled by the first scheduling information. In some implementations, the first scheduling information may be for PTM transmission scheme 1, and the second scheduling information may be for PTM transmission scheme 2. In some implementations, the first scheduling information may be for PTM transmission scheme 2, and the second scheduling information may be for PTP. Further, the UE may always determine the received second scheduling information as toggled when compared with the previous scheduling information with the same HARQ process, regardless of the value of the NDI.

In some implementations, the UE may start monitoring scheduling information associated with another leg. For example, if the UE does not successfully receive/decode scheduling information and/or DL data (e.g., MAC PDU) associated with a PTM leg for a (consecutive) number of times, the UE may start monitoring scheduling information associated with a PTP leg, where the DL data may include MBS data, and the PTM leg and the PTP leg may be associated with a common PDCP entity. Further, the scheduling information may be associated with a G-RNTI and/or C-RNTI. The (consecutive) number of times may be configured by the network.

Moreover, the scheduling information associated with the PTM leg (e.g., the PTM leg 202 in FIG. 2) may be used to schedule a DL resource for a new transmission. The scheduling information associated with the PTP leg (e.g., the PTP leg 204 in FIG. 2) may be used to schedule a DL resource for a retransmission. The scheduling information associated with the PTP leg may have the same HARQ process/MBS as the scheduling information associated with the PTM leg. The UE may stop monitoring the scheduling information associated with the PTP leg if it successfully receives scheduling information and/or a corresponding DL resource (e.g., MAC PDU) associated with the PTP leg.

In some implementations, if the UE does not successfully receive/decode scheduling information and/or DL data (e.g., MAC PDU) associated with the PTP leg for a (consecutive) number of times, the UE may start monitoring scheduling information associated with a PTM leg, where the DL data may include MBS data, and the PTM leg and the PTP leg may be associated with a common PDCP entity. As described above, the scheduling information may be associated with a G-RNTI and/or C-RNTI. The number of times may be configured by the network. The scheduling information associated with the PTP leg may be used to schedule a DL resource for a new transmission. The scheduling information associated with the PTM leg may be used to schedule a DL resource for retransmission. The scheduling information associated with the PTP leg may have the same HARQ process/MBS as the scheduling information associated with the PTM leg. Further, the UE may stop monitoring the scheduling information associated with the PTM leg if it successfully receives scheduling information and/or a corresponding DL resource (e.g., MAC PDU) associated with the PTM leg.

In some implementations, the UE may (be expected to) receive a dynamic switching indication. For example, a dynamic switching indication may PHY-based, e.g., via DCI. Moreover, the dynamic switching indication may be indicated by a specific flag in a DCI field (with a specific DCI format). The specific flag may be A bits long (e.g., 1 bit) when the UE is expected to receive a dynamic switching indication. On the other band, the specific flag may be B bits long (e.g., 0 bit) when the UE is not expected to receive a dynamic switching indication. Moreover, if a specific value (e.g., 1) is indicated by the specific flag, the UE may determine that the corresponding DCI is for indicating a dynamic switching indication.

If a UE does not successfully receive the scheduling information and/or DL data (e.g., MAC PDU) associated with a PTM/PTP leg (for a (consecutive) number of times), the UE may be expected to receive a dynamic switching indication, where the DL data may include MBS data, and the scheduling information may be associated with a G-RNTI and/or C-RNTI. Consequently, The UE may stop monitoring for dynamic switching indication and/or may no longer be expected to receive another dynamic switching indication if it has successfully received the dynamic switching indication and/or after it has performed dynamic switching.

Figure 6:
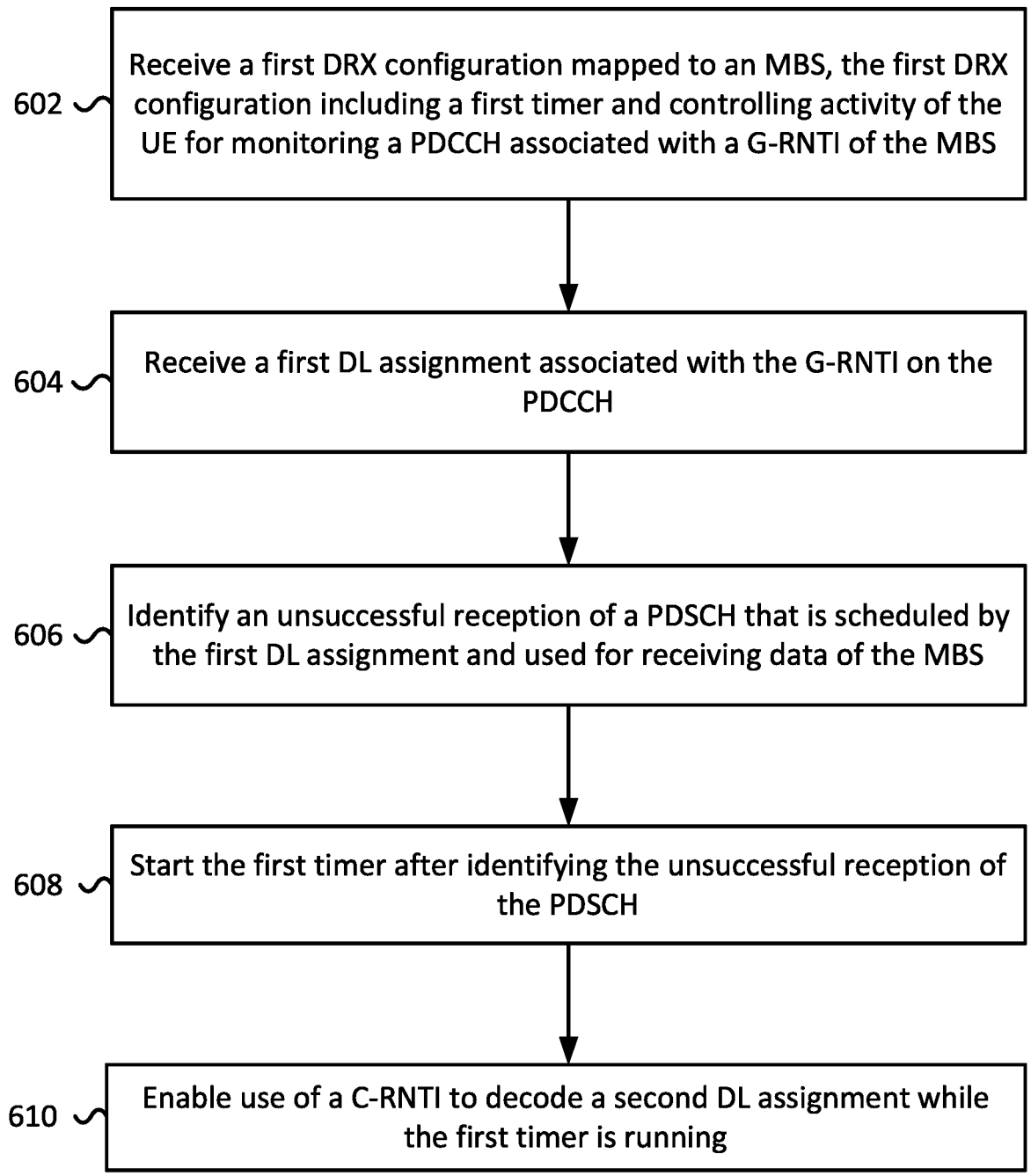
FIG. 6 is a flowchart of a method for management of MBS data reception according to an implementation of the present disclosure.

FIG. 6 is a flowchart of a method 600 for management of MBS data reception according to an implementation of the present disclosure. Although actions 602, 604, 606, 608, and 610 are illustrated as separate actions represented as independent blocks in FIG. 6, these separately illustrated actions should not be construed as necessarily order-dependent. The order in which the actions are performed in FIG. 6 is not intended to be construed as a limitation, and any number of the disclosed blocks may be combined in any order to implement the method, or an alternate method. Moreover, each of actions 602, 604, 606, 608, and 610 may be performed independent of other actions, and can be omitted in some implementations of the present disclosure.

In action 602, the UE may receive a first DRX configuration mapped to an MBS. The first DRX configuration may include a first timer and controlling activity of the UE for monitoring a PDCCH associated with a G-RNTI of the MBS. In some implementations, the first timer may be configured to determine a maximum duration until a retransmission of the data of the MBS is received. For example, the first timer may be a retransmission timer described in the present disclosure.

In action 604, the UE may receive a first DL assignment associated with the G-RNTI on the PDCCH. For example, the first DL assignment may be scheduling information contained in the DCI with CRC scrambled by the G-RNTI. The first DL assignment may include resource location information (e.g., PDSCH) that indicates to the UE where to receive/monitor the data of the MBS on a scheduled PDSCH.

In action 606, the UE may identify an unsuccessful reception of a PDSCH that is scheduled by the first DL assignment and used for receiving data of the MBS. That is, the UE finds that it does not successfully receive the PDSCH scheduled by the first DL assignment.

In action 608, the UE may start the first timer after identifying the unsuccessful reception of the PDSCH.

In action 610, the UE may enable use of a C-RNTI to decode a second DL assignment while the first timer is running. Given this, if the second DL assignment is scheduling information contained in the DCI with CRC scrambled by the C-RNTI, the UE can successfully decode/receive/monitor the second DL assignment. In some implementations, the first DL assignment and the second DL assignment may be mapped to the same HARQ process ID. Moreover, the NDI of the second DL assignment may be considered as not toggled when comparing with the NDI of the first DL assignment. As such, the UE may identify that the second DL assignment is used for scheduling a retransmission of the PDSCH scheduled by the first DL assignment. In some implementations, the first DL assignment and the second DL assignment may be scheduled on different PDCCHs or different search spaces. The G-RNTI and the C-RNTI may associate with different CORESETs/PDCCHs/search spaces.

Consequently, even if the first timer is a retransmission timer for controlling the PDCCH monitoring activity for a UE's G-RNTI and is started due to an unsuccessful reception of a PDSCH that is scheduled by a first DL assignment associated with the G-RNTI, the UE is also expected to receive a second DL assignment associated with another type of RNTI, e.g., a C-RNTI, while the retransmission timer is running. Given this, the UE has the chance to receive the retransmitted (or new) data of the MBS under the PTP and PTM transmission schemes, thereby improving the reliability of MBS data reception.

In some implementations, the UE may further enable use of the G-RNTI to decode a third DL assignment while the first timer is running.

In some implementations, the UE may also have the same protocol structure as that illustrated in FIG. 2. For example, the UE may be configured with a PDCP entity associated with a first RLC entity and a second RLC entity, where the first RLC entity, as part of the PTM leg of the UE, may be associated with the first DL assignment, and the second RLC entity, as part of the PTP leg, may be associated with the second DL assignment.

In some implementations, the UE may be configured with a set of one more DRX configurations including the first DRX configuration. Each DRX configuration (e.g., a first DRX configuration) in the set of DRX configurations may be configured on a per-MBS basis. Further, each DRX configuration may include a corresponding first timer as described in the method 600. That is, each first timer can also be considered as being configured on a per-MBS basis and operates independently from each other.

In some implementations, the UE may receive a second DRX configuration that does not map to any MBS, the second DRX configuration including a second timer; start the second timer after identifying the unsuccessful reception of the PDSCH; and enable to use the C-RNTI to decode the second DL assignment while the second timer is running.

Operation 5: Stop Monitoring at a Specific Location for Initial Transmission.

In some implementations, the UE may stop monitoring from at least one of the locations as defined above (e.g., location 1 to location 4) for scheduling information. Moreover, the scheduling information may schedule a DL resource for a new transmission of a MAC PDU.

For example, if a UE does not successfully receive/decode scheduling information and/or DL data (e.g., MAC PDU) of a HARQ process for a new transmission (for a (consecutive) number of times), the UE may stop monitoring for the scheduling information and/or the DL data (e.g., MAC PDU), where the DL data may include MBS data.

For example, if a UE does not successfully receive/decode scheduling information and/or DL data (e.g., MAC PDU) of an MBS for a new transmission for a (consecutive) number of times, the UE may stop monitoring for the scheduling information and/or the DL data (e.g., MAC PDU), where the DL data may include MBS data.

In some implementations, a UE may stop monitoring scheduling information associated with the same leg.

For example, if a UE does not successfully receive/decode scheduling information and/or DL data (e.g., MAC PDU) associated with a PTM/PTP leg (for a (consecutive) number of times), the UE may stop monitoring scheduling information associated with the PTM/PTP leg, where the DL data may include MBS data, the number of times may be configured by the network, and the scheduling information may be associated with a G-RNTI and/or C-RNTI.

Operation 6: Sends a Specific Message to the Network.

In some implementations, the specific message may include at least one of the following contents (a) to (d):

(a) Content that requests the network for a dynamic switching indication. In this case, the specific message may identify the MBS that a UE prefers to receive in a different reception mode (e.g., PTM or PTP). An MBS identity (e.g., G-RNTI, TMGI, sessionId, LCID, bearer ID, QoS flow ID, etc.) may be included in the specific message to identify the MBS that a UE prefers to receive in a different reception mode.

(b) Content that indicates the frequency location (e.g., BWP, serving cell, MBS common frequency resource, etc) that the UE is having difficulty receiving the MBS. In this case, the specific message may identify the BWP/serving cell/MBS common frequency resource that the UE fails to receive/decode the scheduling information and/or DL data (e.g., MAC PDU) of MBS.

(c) Content that indicates the frequency location (e.g., BWP, serving cell, MBS common frequency resource, etc) that the UE is interested in receiving the MBS. In this case, the specific message may identify the BWP/serving cell/MBS common frequency resource that the UE is interested in receiving an MBS.

(d) Content that indicates the last received (PDCP) PDU that the UE has been successfully decoded.

In some implementations, the contents may be included in a MAC CE and/or RRC signalling.

In some implementations, the specific message may be a PDCP status report. For example, if a receiving PDCP entity of a UE does not receive a PDCP PDU (for a specific period), the peer transmitting PDCP entity of the UE may trigger a PDCP status report. The UE may trigger a PDCP status report if the receiving PDCP entity is configured with a PTP leg and a PTM leg. The specific period may be configured by the network via dedicated RRC signaling and/or broadcast system information (e.g., SIB).

Operation 7: Performs State Transition.

In some implementations, if a UE is in the RRC_IDLE/RRC_INACTIVE state, the UE may transit to the RRC_CONNECTED state via RRC Connection Establishment/RRC Resume Procedure in order to receive the same MBS.

For example, if a UE in the RRC_IDLE/RRC_INACTIVE state does not successfully receive/decode scheduling information and/or DL data (e.g., MAC PDU) of an MBS (for a (consecutive) number of times), the UE may initiate an RRC Connection Establishment/RRC Resume procedure, where the DL data may include MBS data.

Moreover, the UE may send a RRCSetupRequest message to the network as part of the RRC Connection Establishment procedure. Moreover, the establishment cause in the RRCSetupRequest message may be used to inform the network that a UE is interested in receiving an MBS (e.g., the corresponding MBS). The establishment cause in the RRCSetupRequest message may be used to inform the network that a UE is interested in receiving an MBS (e.g., the corresponding MBS) via unicast manner. In another example, the UE may send assistance information in RRCSetupComplete message to inform the network that a UE is interested in receiving an MBS (e.g., the corresponding MBS) via unicast manner.

In some implementations, the UE may send an RRCResumeRequest message to the network as part of the RRC Resume procedure. Moreover, the resume cause in the RRCResumeRequest message may inform the network that a UE is interested in receiving an MBS (e.g., the corresponding MBS). The resume cause in the RRCResumeRequest message may inform the network that a UE is interested in receiving an MBS (e.g., the corresponding MBS) via unicast manner. In another example, the UE may send assistance information in RRCResumeComplete message to inform the network that a UE is interested in receiving an MBS (e.g., the corresponding MBS) via unicast manner.

Operation 8: Initiates a Specific Type of RA Procedure.

In some implementations, the (MAC entity of the) UE may initiate a specific type of RA procedure. The specific type of RA procedure may be used to inform the network that the UE is interested in receiving an MBS (e.g., the corresponding MBS). For example, if a UE (in RRC_CONNECTED) does not successfully receive/decode scheduling information and/or DL data (e.g., MAC PDU) of an MBS (for a (consecutive) number of times), the (MAC entity of the) UE may initiate a specific type of RA procedure, where the DL data may include MBS data.

A specific RA preamble and/or a (specific) RA preamble located in a specific RA resource(s) (e.g., in time domain and/or frequency domain) may be transmitted by the UE as part of the RA procedure. The specific RA preamble and/or specific RA resource(s) and/or specific RACH occasion and/or specific PUSCH occasion may be used to inform the network that the UE is interested in receiving an MBS (e.g., the corresponding MBS). The specific RA preamble and/or specific RA resource(s) may be used to inform the network that the UE is interested in receiving an MBS (e.g., the corresponding MBS) via unicast manner. In some implementations, different MBSs or MBS group(s) may be configured with different specific RA preamble and/or specific RA resource(s).

Moreover, a specific MAC CE may be transmitted by the UE in MSG3/MSGA as part of the RA procedure. The specific MAC CE may be used to inform the network that the UE is interested in receiving an MBS (e.g., the corresponding MBS). The specific MAC CE may be used to inform the network that the UE is interested in receiving an MBS (e.g., the corresponding MBS) via unicast manner.

If the UE receives scheduling information and/or data (e.g., TB) of the corresponding MBS while the RA procedure is ongoing, the RA procedure may be stopped.

Operation 9: Releases/Deactivates/Suspends/Clears a Specific Configuration.

In some implementations, the specific configuration may be an SPS group common PDSCH configuration. The SPS group common PDSCH configuration may be configured for transmitting a specific MBS. For example, if a UE (in the RRC_CONNECTED state) does not successfully receive/decode scheduling information and/or DL data (e.g., MAC PDU) of an SPS group common PDSCH configuration (for a (consecutive) number of times), the (MAC entity of the) UE may release/deactivate/suspend/clear the specific SPS group common PDSCH configuration, where the DL data may include MBS data. Further, the UE may inform the network that it has released/deactivated/suspended/cleared the SPS group common PDSCH configuration.

Figure 7:
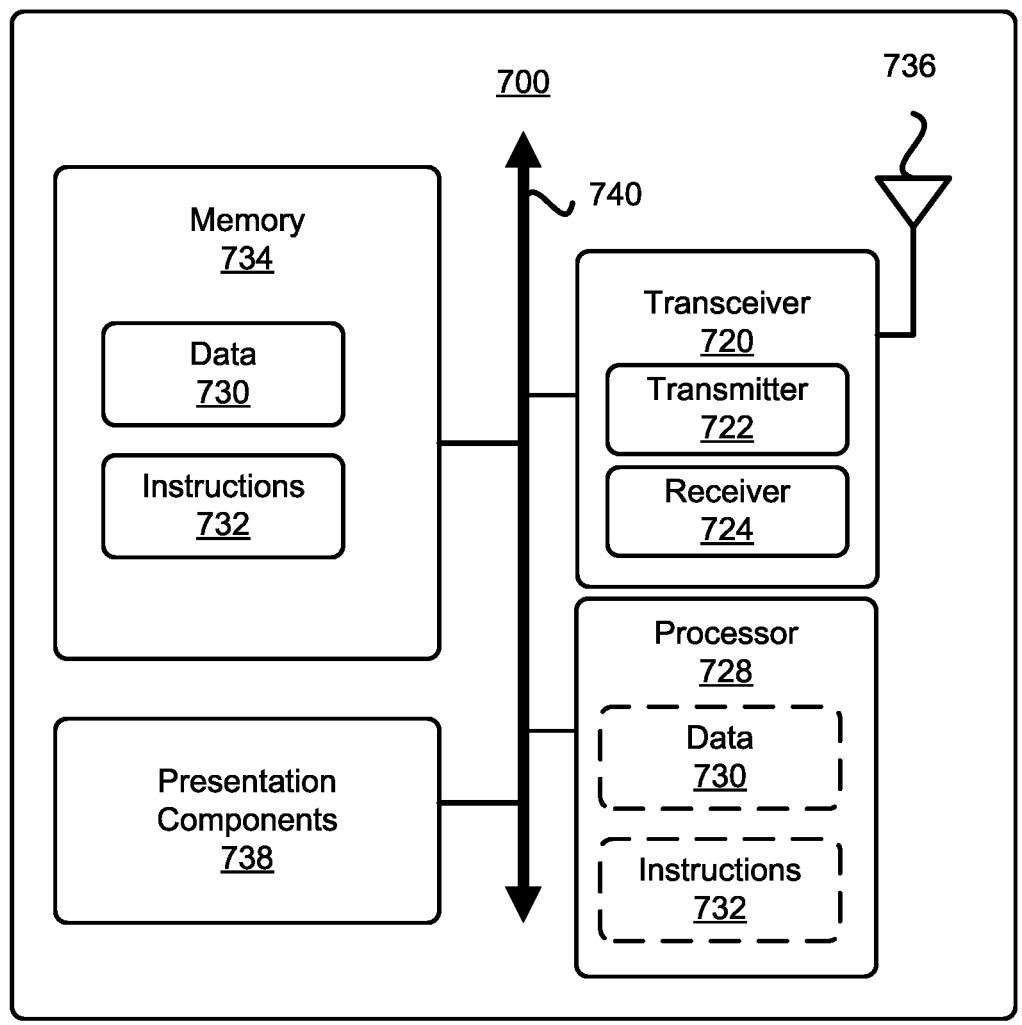
FIG. 7 is a block diagram illustrating a node for wireless communication according to an implementation of the present disclosure.

FIG. 7 is a block diagram illustrating a node 700 for wireless communication according to an implementation of the present disclosure. As illustrated in FIG. 7, a node 700 may include a transceiver 720, a processor 728, a memory 734, one or more presentation components 738, and at least one antenna 736. The node 700 may also include a radio frequency (RF) spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including but not limited to usable, non-usable and flexibly usable subframes and slot formats. The transceiver 720 may be configured to receive data and control channels.

The node 700 may include a variety of computer-readable media. Computer-readable media may be any available media that may be accessed by the node 700 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof. Example memory may include solid-state memory, hard drives, optical-disc drives, etc. As illustrated in FIG. 7, the memory 734 may store a computer-readable and/or computer-executable program 732 (e.g., software codes or a set of instructions) that are configured to, when executed, cause the processor 728 to perform various functions disclosed herein, for example, with reference to FIGS. 1 through 6. Alternatively, the program 732 may not be directly executable by the processor 728 but may be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory. The processor 728 may process the data 730 and the program 732 received from the memory 738, and information transmitted and received via the transceiver 720, the baseband communications module, and/or the network communications module. The processor 728 may also process information to send to the transceiver 720 for transmission via the antenna 736 to the network communications module for transmission to a CN.

One or more presentation components 738 may present data indications to a person or another device. Examples of presentation components 738 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:
1. A method performed by a User Equipment (UE) for management of Multicast-Broadcast Service (MBS) data reception, the method comprising:
receiving a first Discontinuous Reception (DRX) configuration mapped to an MBS, the first DRX configuration including a first timer for controlling activity of the UE for monitoring a Physical Downlink Control Channel (PDCCH) associated with a Group Radio Network Temporary Identifier (G-RNTI) of the MBS;
receiving a first Downlink (DL) assignment associated with the G-RNTI on the PDCCH;
identifying an unsuccessful reception of a Physical Downlink Shared Channel (PDSCH) that is scheduled by the first DL assignment and used for receiving data of the MBS;
starting the first timer after identifying the unsuccessful reception of the PDSCH;
enabling use of a Cell Radio Network Temporary Identifier (C-RNTI) to decode a second DL assignment while the first timer is running;
receiving a second DRX configuration that does not map to any MBS, the second DRX configuration including a second timer;
starting the second timer after identifying the unsuccessful reception of the PDSCH; and enabling use of the C-RNTI to decode the second DL assignment while the second timer is running.

2. The method according to claim 1, wherein the first timer is configured to determine a maximum duration until a retransmission of the data of the MBS is received.

3. The method according to claim 1, wherein the second DL assignment schedules a retransmission of the data of the MBS.

4. The method according to claim 1, wherein the first DL assignment and the second DL assignment are mapped to a same Hybrid Automatic Repeat Request (HARQ) process Identity (ID).

5. The method according to claim 1, wherein the first DL assignment and the second DL assignment are scheduled on different PDCCHs or different search spaces.

6. The method according to claim 1, further comprising: enabling use of the G-RNTI to decode a third DL assignment while the first timer is running.

7. The method according to claim 1, wherein:
the UE is configured with a Packet Data Convergence Protocol (PDCP) entity associated with a first Radio Link Control (RLC) entity and a second RLC entity;
the first RLC entity is associated with the first DL assignment; and
the second RLC entity is associated with the second DL assignment.

8. The method according to claim 1, wherein the UE is configured with a plurality of DRX configurations including the first DRX configuration and the second DRX configuration, and each DRX configuration in the plurality of DRX configurations is configured on a per-MBS basis.

9. A User Equipment (UE) for management of Multicast-Broadcast Service (MBS) data reception, the UE comprising:
at least one non-transitory computer-readable medium storing one or more computer-executable instructions; and
at least one processor coupled to the at least one non-transitory computer-readable medium and configured to execute the one or more computer-executable instructions to cause the UE to:
receive a first Discontinuous Reception (DRX) configuration mapped to an MBS, the first DRX configuration including a first timer for controlling activity of the UE for monitoring a Physical Downlink Control Channel (PDCCH) associated with a Group Radio Network Temporary Identifier (G-RNTI) of the MBS;
receive a first Downlink (DL) assignment associated with the G-RNTI on the PDCCH;
identify an unsuccessful reception of a Physical Downlink Shared Channel (PDSCH) that is scheduled by the first DL assignment and used for receiving data of the MBS;
start the first timer after identifying the unsuccessful reception of the PDSCH;
enable use of a Cell Radio Network Temporary Identifier (C-RNTI) to decode a second DL assignment while the first timer is running;
receive a second DRX configuration that does not map to any MBS, the second DRX configuration including a second timer;
start the second timer after identifying the unsuccessful reception of the PDSCH; and
enable use of the C-RNTI to decode the second DL assignment while the second timer is running.

10. The UE according to claim 9, wherein the first timer is configured to determine a maximum duration until a retransmission of the data of the MBS is received.

11. The UE according to claim 9, wherein the second DL assignment schedules a retransmission of the data of the MBS.

12. The UE according to claim 9, wherein the first DL assignment and the second DL assignment are mapped to a same Hybrid Automatic Repeat Request (HARQ) process Identity (ID).

13. The UE according to claim 9, wherein the first DL assignment and the second DL assignment are scheduled on different PDCCHs or different search spaces.

14. The UE according to claim 9, wherein the at least one processor is further configured to execute one or more computer-executable instructions to:
enable use of the G-RNTI to decode a third DL assignment while the first timer is running.

15. The UE according to claim 9, wherein:
the UE is configured with a Packet Data Convergence Protocol (PDCP) entity associated with a first Radio Link Control (RLC) entity and a second RLC entity;
the first RLC entity is associated with the first DL assignment; and
the second RLC entity is associated with the second DL assignment.

16. The UE according to claim 9, wherein the UE is configured with a plurality of DRX configurations including the first DRX configuration and the second DRX configuration, and each DRX configuration in the plurality of DRX configurations is configured on a per-MBS basis.

* * * * *